United States Patent
Tanaka et al.

(10) Patent No.: US 11,754,402 B2
(45) Date of Patent: Sep. 12, 2023

(54) COURSE GENERATION APPARATUS AND VEHICLE CONTROL APPARATUS

(71) Applicant: Mitsubishi Electric Corporation, Tokyo (JP)

(72) Inventors: Takayuki Tanaka, Tokyo (JP); Michihiro Ogata, Tokyo (JP); Taiki Kumi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 43 days.

(21) Appl. No.: 17/587,479

(22) Filed: Jan. 28, 2022

(65) Prior Publication Data
US 2022/0326021 A1  Oct. 13, 2022

(30) Foreign Application Priority Data
Mar. 18, 2021 (JP) ................. 2021-044260

(51) Int. Cl.
*G01C 21/28* (2006.01)
*G01S 19/39* (2010.01)
*G01C 21/34* (2006.01)
*G01S 19/40* (2010.01)
*B60W 60/00* (2020.01)

(52) U.S. Cl.
CPC ......... *G01C 21/28* (2013.01); *G01C 21/3461* (2013.01); *G01S 19/396* (2019.08); *G01S 19/40* (2013.01); *B60W 60/001* (2020.02)

(58) Field of Classification Search
CPC .................................................. G01C 21/28
See application file for complete search history.

(56) References Cited

U.S. PATENT DOCUMENTS

2022/0082403 A1* 3/2022 Shapira .............. G01C 21/3848

FOREIGN PATENT DOCUMENTS

| CN | 107031505 B | * | 8/2019 | .............. B60Q 9/00 |
| DE | 102011119752 A1 | * | 8/2012 | ......... G01C 21/3626 |
| JP | 2000-207692 A | | 7/2000 | |
| JP | 2004178367 A | * | 6/2004 | |
| JP | 2017-084137 A | | 5/2017 | |

\* cited by examiner

*Primary Examiner* — Shelley Chen
(74) *Attorney, Agent, or Firm* — Sughrue Mion, PLLC; Richard C. Turner

(57) ABSTRACT

There has been a problem that because in a section where a road forks from a main lane or merges the main lane, the number of lanes increases or decreases, breakage of a lane line and existence of other vehicles hinder the lane line from being read and hence generation of a target course becomes unstable. A course generation apparatus according to the present disclosure is provided with a prohibition-section determination unit that determines, in the case of forking from a main lane or merging with the main lane, that a present section is an environmental-information-course usage prohibition section, until a time when a vehicle position passes through a forking completion point or a merging completion point, and with a course selection unit that selects an environmental information course or a route-information course in a normal time and selects the route-information course in the environmental-information-course usage prohibition section.

9 Claims, 20 Drawing Sheets

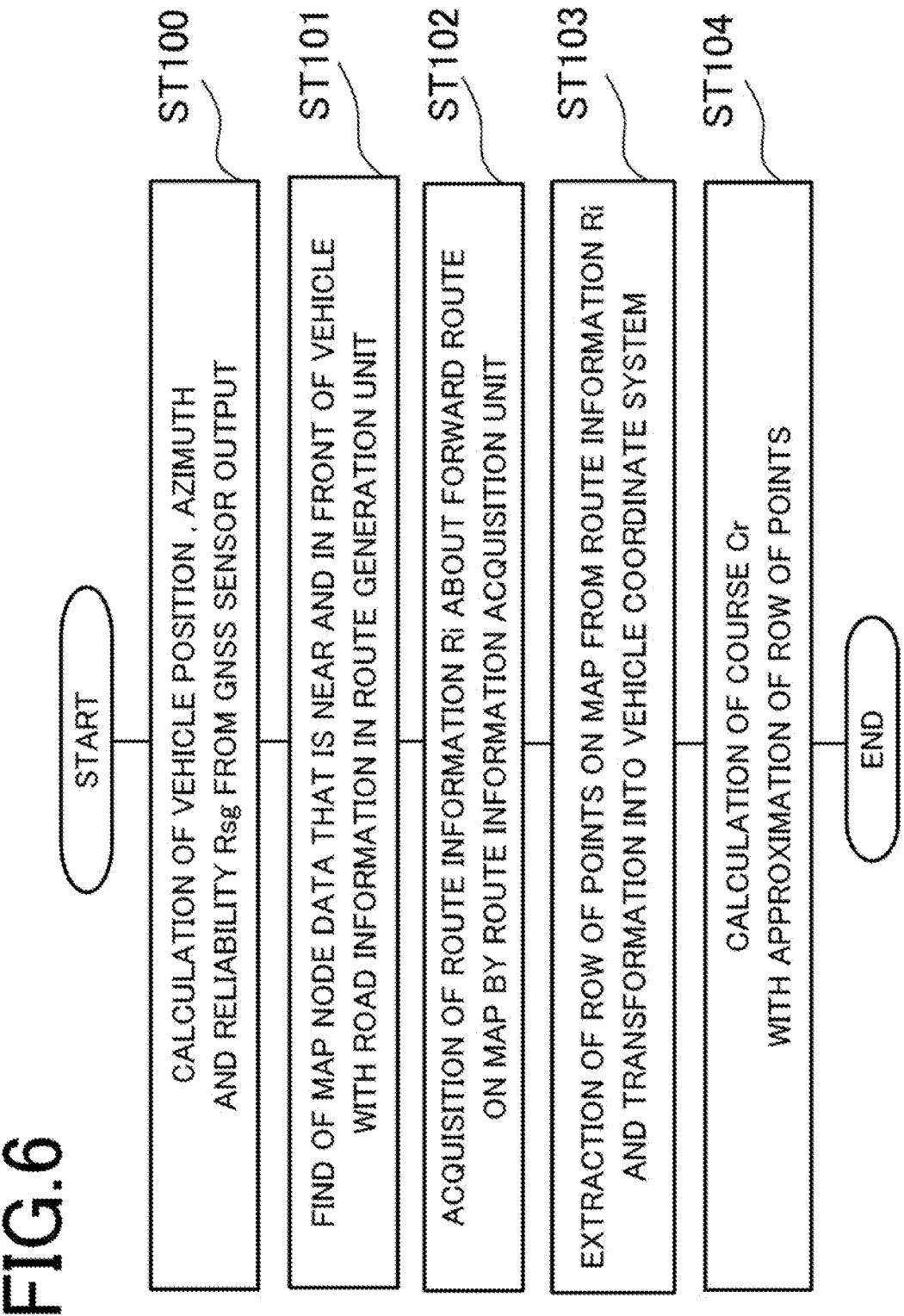

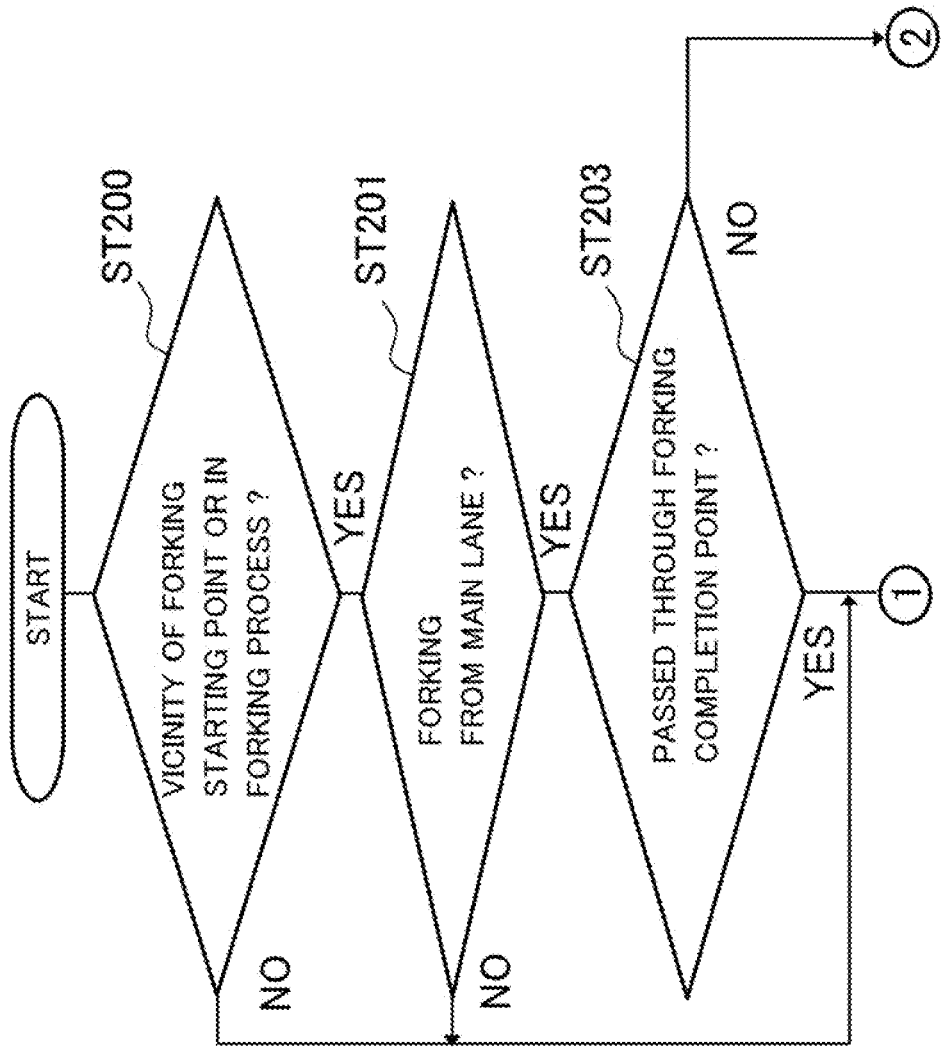

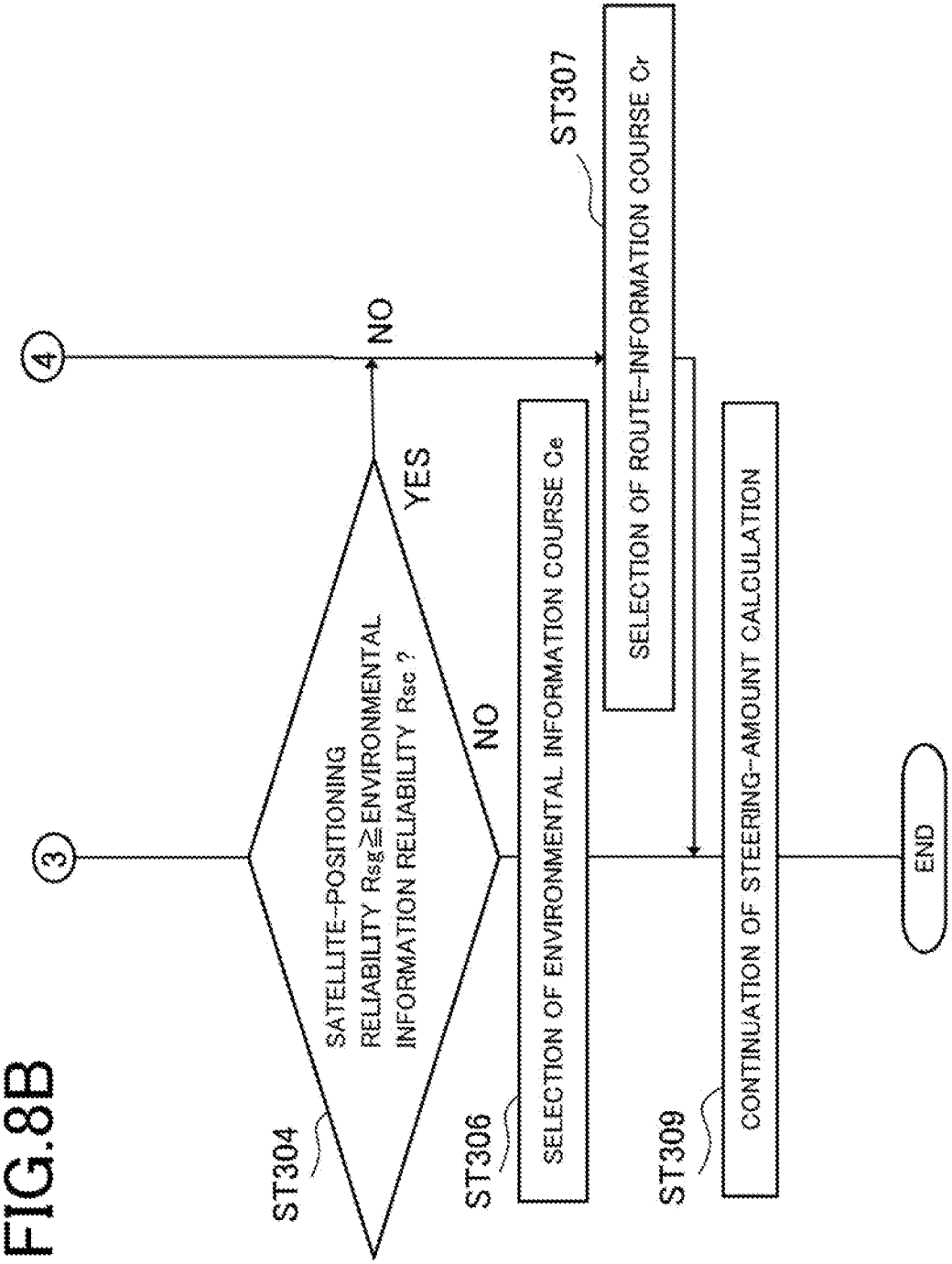

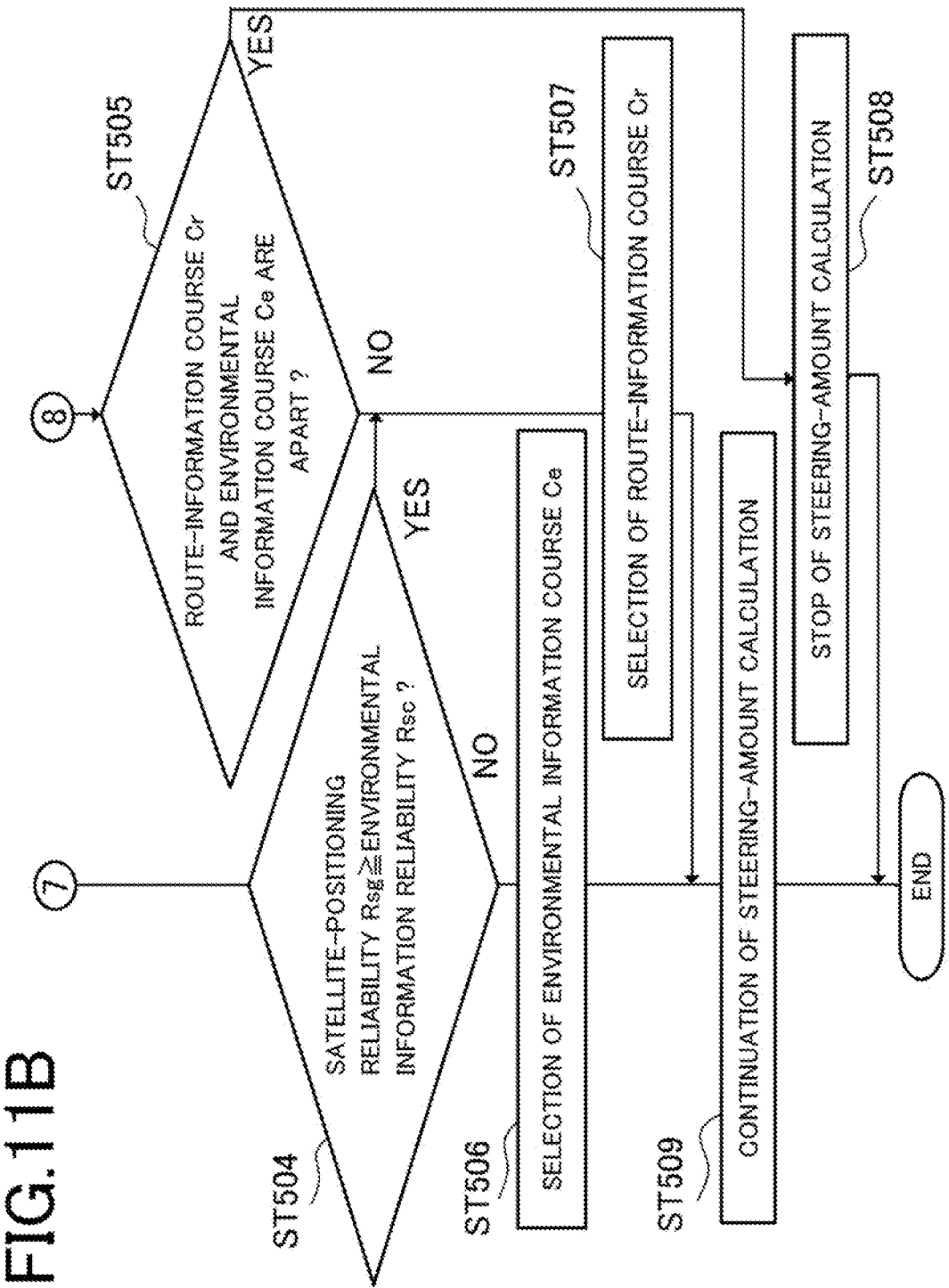

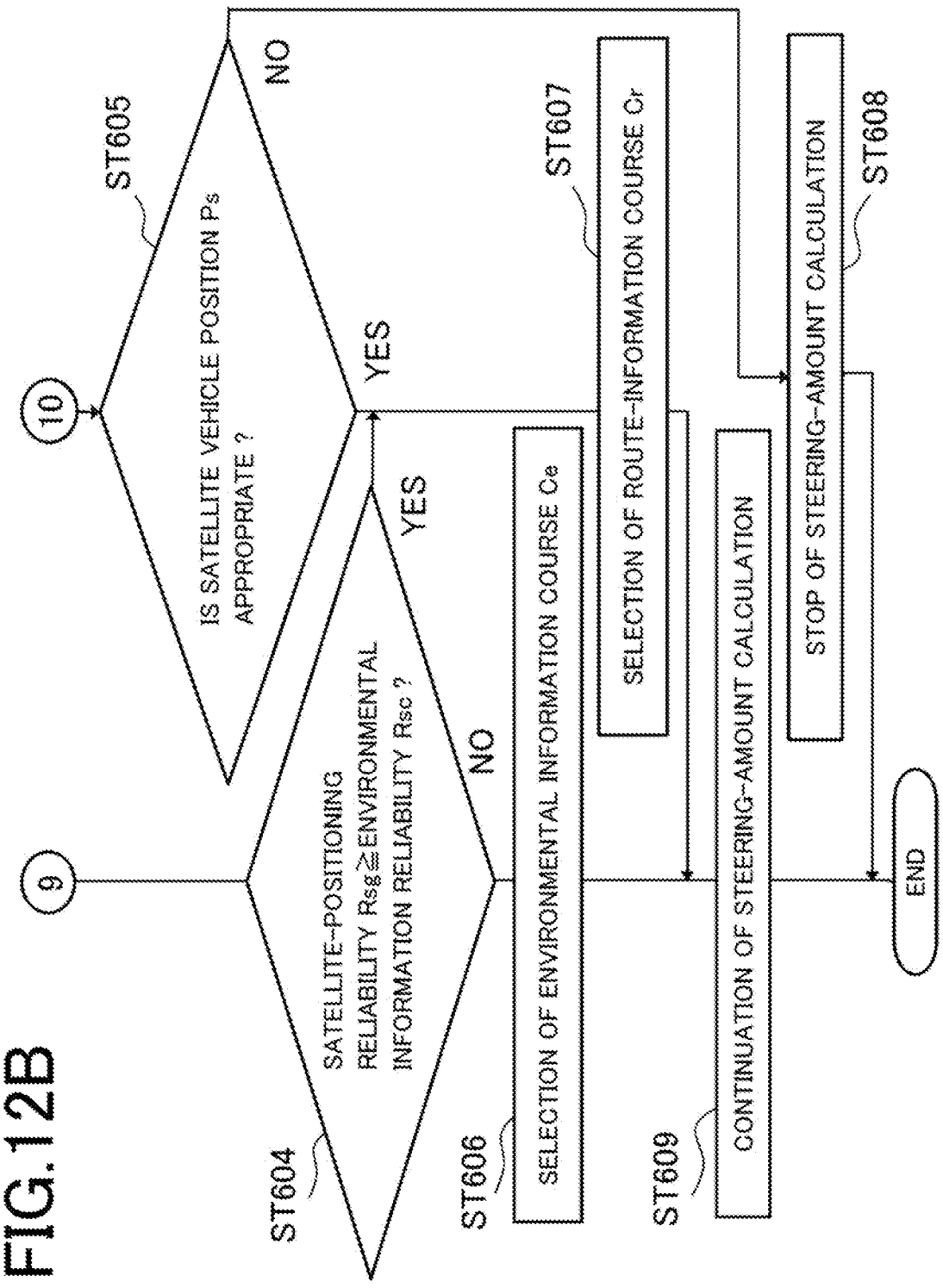

COURSE GENERATION APPARATUS AND VEHICLE CONTROL APPARATUS

BACKGROUND OF THE INVENTION

Field of the Invention

The present disclosure relates to a course generation apparatus and a vehicle control apparatus.

Description of the Related Art

There has been proposed a vehicle control apparatus for realizing autonomous driving of a vehicle. A course generation apparatus in a vehicle control apparatus generates a target course (referred to also as a target route) for a vehicle. The vehicle control apparatus issues an instruction to a steering control apparatus so that the vehicle follows the target course. The steering control apparatus obtains a target steering angle and then performs control for making an actual steering angle follow the target steering angle, so that advance along the target course is realized.

With regard to generation of a target course along a road, there is well known a means in which lane line detection through a vehicle front camera or a vehicle periphery camera is utilized. However, when a road forks from a main lane, the number of lanes increases or decreases in a section from the forking starting point to the forking ending point; thus, breakage of the lane line and a change in the lane width are caused. Similarly, when a road merges a main lane, the number of lanes increases or decreases in a section from the junction starting point to the junction ending point; thus, breakage of the lane line and a change in the lane width are caused. In these cases, neither the vehicle front camera nor the vehicle periphery camera may be able to stably detect a lane line. In these cases, there exists a problem that it is difficult to stably generate a target course.

Meanwhile, it is made possible that a vehicle location is positioned based on a signal from a positioning satellite and then is applied to a target route to be obtained from map information so that a target course is generated. However, positioning by use of a positioning satellite may include a relatively large error; furthermore, in some cases, depending on a radio wave condition, the error is enlarged and hence the reliability is deteriorated. Accordingly, it is undesirable that a target course is generated by constantly positioning a vehicle location only based on a signal from a positioning satellite.

With regard to these problems, there has been disclosed a technology in which the reliability of a road lane-line position, detected by a camera for a section of forking from a main lane of a road or a section of merging the main lane, is deteriorated based on a result of superimposing a vehicle location, obtained based on a signal from a positioning satellite, on map information (e.g., Patent Document 1). In addition, there has been disclosed a method in which a target course is generated in such a way that a forking section or a merging section is detected based on map information and then only the road lane-line position at the side opposite to the forking direction or the merging direction is recognized by a camera (e.g., Patent Document 2).

PRIOR ART REFERENCE

Patent Document

[Patent Document 1] Japanese Patent Application Laid-Open No. 2017-84137

[Patent Document 2] Japanese Patent Application Laid-Open No. 2000-207692

SUMMARY OF THE INVENTION

Each of the technologies disclosed in Patent Documents 1 and makes it possible to stably generate a target course for traveling on the main lane of a road. However, because in a section where a road forks from the main lane or merges the main lane, the number of lanes increases or decreases, breakage of the lane line and a change in the lane width may disable the target course from being stably generated. Moreover, also when due to traffic congestion in a section where a road forks from the main lane or merges the main lane, other vehicles exist and hence the lane line cannot be read, the target course may not stably be generated.

The objective of the present disclosure is to provide a course generation apparatus and a vehicle control apparatus for solving a problem that because in a section where a road forks from a main lane or merges the main lane, the number of lanes increases or decreases, breakage of a lane line, a change in the lane width, and existence of other vehicles hinder the lane line from being read and hence generation of a target course becomes unstable.

A course generation apparatus according to the present disclosure includes an environmental information acquisition unit that acquires environmental information of surroundings of a vehicle, an environmental-information course calculation unit that calculates a course on which a vehicle should advance, based on environmental information acquired by the environmental information acquisition unit, a positioning unit that positions a vehicle position, based on a signal from a positioning satellite, a route generation unit that generates an on-a-map route on which a vehicle should travel, a route information acquisition unit that acquires information on a forward route of the vehicle position positioned by the positioning unit, from the route generated by the route generation unit, a route-information course calculation unit that calculates a course on which a vehicle should advance, from the information on the forward route acquired by the route information acquisition unit, a prohibition-section determination unit that determines, in the case where the information on the forward route acquired by the route information acquisition unit indicates forking from a main lane, that a present section is an environmental-information-course usage prohibition section, during a period from a time when the vehicle position positioned by the positioning unit passes through a point before a forking starting point by a predetermined distance to a time when the vehicle position passes through a forking completion point, and a course selection unit that selects a course calculated by the route-information course calculation unit in the environmental-information-course usage prohibition section and that selects a course calculated by the environmental-information course calculation unit or a course calculated by the route-information course calculation unit in a section other than the environmental-information-course usage prohibition section.

In addition, a course generation apparatus according to the present disclosure includes an environmental information acquisition unit that acquires environmental information of surroundings of a vehicle, an environmental-information course calculation unit that calculates a course on which a vehicle should advance, based on environmental information acquired by the environmental information acquisition unit, a positioning unit that positions a vehicle position, based on a signal from a positioning satellite, a route generation unit that generates an on-a-map route on which a vehicle should travel, a route information acquisition unit that acquires information on a forward route of the vehicle position positioned by the positioning unit, from the route generated by the route generation unit, a route-information course calculation unit that calculates a course on which a vehicle should advance, from the information on the forward route acquired by the route information acquisition unit, a prohibition-section determination unit that determines, in the case where the information on the forward route acquired by the route information acquisition unit indicates merging with a main lane, that a present section is an environmental-information-course usage prohibition section, during a period from a time when the vehicle position positioned by the positioning unit passes through a point before a merging starting point by a predetermined second distance to a time when the vehicle position passes through a merging completion point, and a course selection unit that selects a course calculated by the route-information course calculation unit in the environmental-information-course usage prohibition section and that selects a course calculated by the environmental-information course calculation unit or a course calculated by the route-information course calculation unit in a section other than the environmental-information-course usage prohibition section.

Furthermore, a vehicle control apparatus according to the present disclosure includes the course generation apparatus and a steering-amount calculation unit that calculates a steering amount, based on a course selected by the course selection unit of the course generation apparatus.

The course generation apparatus and the vehicle control apparatus according to the present disclosure make it possible that in a section where a road forks from a main lane or merges with the main lane, a stable target course is generated and that a steering amount is calculated based on the stable target course.

The foregoing and other object, features, aspects, and advantages of the present invention will become more apparent from the following detailed description of the present invention when taken in conjunction with the accompanying drawings.

BRIEF DESCRIPTION OF THE DRAWINGS

FIG. 6 is a flowchart representing processing, according to Embodiment 1, for generating a course on which the vehicle should advance, from an on-a-map route;

FIG. 7A is a first half of a flowchart representing processing, according to Embodiment 1, for generating a course on which the vehicle should advance at a forking timing;

FIG. 8B is a second half of the flowchart representing processing, according to Embodiment 1, for generating the course on which the vehicle should advance at the merging timing;

FIG. 11B is a second half of the first flowchart representing processing, according to Embodiment 2, for stopping steering-amount calculation at the merging timing;

FIG. 12B is a second half of the second flowchart representing processing, according to Embodiment 2, for stopping steering-amount calculation at the forking timing;

DETAILED DESCRIPTION OF THE PREFERRED EMBODIMENTS

Figure 1:
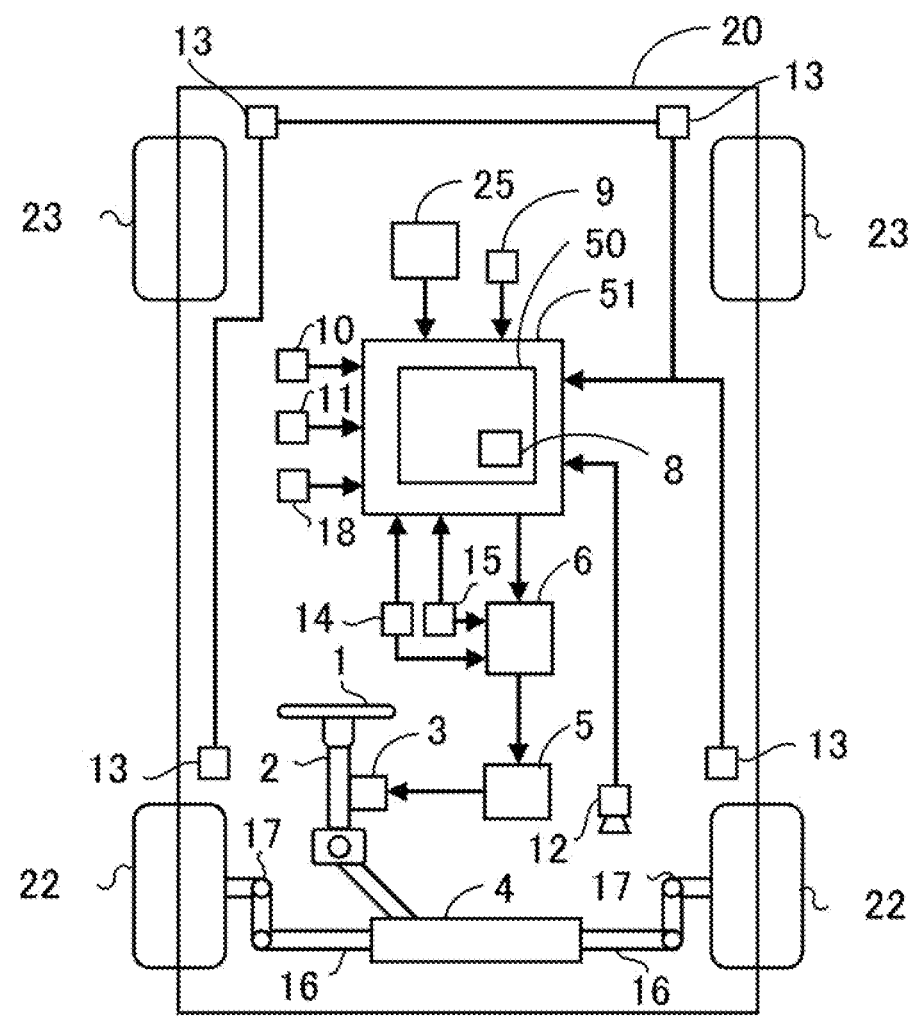
FIG. 1 is a configuration diagram of a course generation apparatus and a vehicle control apparatus according to Embodiment 1.

Hereinafter, embodiments will be explained with reference to the attached drawings.

The drawings are schematically expressed; for the convenience of explanation, configurations will appropriately be omitted or simplified. The relative relationships among the sizes and among positions of the respective configurations or the like represented in the different drawings are not necessarily expressed in an accurate manner but may appropriately be changed. In order to facilitate the understanding of the contents of an embodiment, hatching may be applied even to a drawing that is not a cross-sectional view but a plan view or the like.

In the following explanations, the same constituent elements will be represented with the same reference characters, and the names and functions thereof are regarded as the same. Accordingly, in order to avoid overlapping, the detailed explanation therefor may be omitted.

Although in the following explanations, a term signifying a specific position or direction, such as "up", "down", "left", "right", "side", "bottom", "front", "rear", or the like, may be utilized, each of these terms is utilized for convenience, in order to facilitate the understanding of the contents of an embodiment, and has no relationship with a direction at a time when the embodiment is put into effect.

Moreover, although in the following explanations, an ordinal number such as "first", "second" or the like may be utilized, each of these terms is utilized for convenience, in order to facilitate the understanding of the contents of an embodiment; the embodiment is not limited by the order to be caused by each of these ordinal numbers.

1. Embodiment 1

Hereinafter, a course generation apparatus 50 and a vehicle control apparatus 51 according to Embodiment 1 will be explained.

<Configuration of Course Generation Apparatus and Vehicle Control Apparatus>

FIG. 1 is a diagram for explaining the course generation apparatus 50 and the vehicle control apparatus 51 according to Embodiment 1, mainly regarding a vehicle steering system of a vehicle 20. As represented in FIG. 1, a steering wheel 1 provided for a driver (i.e., an operator) to operate the vehicle 20 is coupled with a steering shaft 2. A pinion shaft is connected with the steering shaft 2, so that a reciprocatable rack-and-pinion mechanism 4 is formed.

Respective front knuckles 17 are connected with the left and right ends of the rack axel of the rack-and-pinion mechanism 4, through the intermediary of respective tie rods 16. Each of the front knuckles 17 pivotably supports a front wheel 22, as a steering wheel, and is steerably supported by a vehicle frame.

Accordingly, torque produced through the driver's operation of the steering wheel 1 makes the steering shaft 2 rotate. Then, the rack-and-pinion mechanism 4 makes the rack axel travel in the left-and-right direction. The travel of the rack axel makes the front knuckle 17 pivot on a kingpin axel (unillustrated in this example), so that the front wheel 22 turns in the left-and-right direction.

Accordingly, the driver can operate a lateral displacement of the vehicle at a time when the vehicle travels forward or backward. The steering shaft 2 can also be rotated by an electric motor 3; when the electric motor 3 is driven by a current from a motor driving apparatus 5, the front wheel 22 can freely be turned independently from the driver's operation of the steering wheel 1.

The motor driving apparatus 5 is an apparatus that controls a current to be applied to the electric motor 3 based on a current command value, as a target value, from a steering control apparatus 6. The steering control apparatus 6 has a function of converting information on a target steering amount to be outputted from the vehicle control apparatus 51 into a current command value to be outputted to the motor driving apparatus 5.

The steering control apparatus 6 is connected with a steering angle sensor 14 and a steering torque sensor 15. The steering control apparatus 6 performs feedback control of a steering angle δ, detected by the steering angle sensor 14 and outputted to the steering control apparatus 6, and a steering torque Td, detected by the steering torque sensor 15 and outputted to the steering control apparatus 6, so as to determine a current command value to be outputted to the motor driving apparatus 5 (neither the steering angle δ nor the steering torque Td is illustrated).

The course generation apparatus 50 generates a course on which the vehicle should advance in an autonomous driving mode. In order to make the vehicle advance on the course generated by the course generation apparatus 50, the vehicle control apparatus 51 determines a target steering amount to be outputted to the steering control apparatus 6.

<Input Signal>

The vehicle control apparatus 51 is connected with a vehicle speed sensor 10, a gyroscopic sensor 11, the steering angle sensor 14, the steering torque sensor 15, an acceleration sensor 18, a front camera 12, a peripheral radar 13, a GNSS (Global Navigation Satellite System) sensor 9, and a user interface 25.

The vehicle speed sensor 10 is provided in each of the front wheel 22 and a rear wheel 23. The vehicle speed sensor 10 has a function of converting an output of a vehicle-speed pulse sensor (unillustrated) for detecting a rotation amount of the vehicle wheel into a vehicle speed of the vehicle 20.

The gyroscopic sensor 11 detects a yaw rate of the vehicle 20. The acceleration sensor 18 detects acceleration of the vehicle 20.

A route generation unit 8 guides the vehicle 20 to a destination to be set by the driver. The GNSS sensor 9 receives a radio wave to be transmitted from a positioning satellite, through an antenna. A positioning unit performs a positioning calculation, so that it is made possible to obtain an absolute position (i.e., latitude, longitude, and altitude), an absolute azimuth, and the reliability of each of them.

In general, a GNSS sensor has a function of outputting positioning quality in a positioning mode or DOP (Dilution of Precision), which is the degree of influence of satellite arrangement to the positioning accuracy. Accordingly, in general, satellite-positioning reliability Rsg of output information is calculated based on the DOP.

The route generation unit 8 has a function of calculating an optimum traveling route for a destination that is set by the driver by use of the user interface 25. The route generation unit 8 stores road information on the traveling route.

The road information is map node data for expressing the shape of a road route. Each map node data integrally includes absolute positions (i.e., latitude values, longitude values, and altitude values), section types, the numbers of lanes, lane widths, cant-angle or slant-angle information pieces, and the like at the respective nodes.

The front camera 12 is provided at a position where the lane line in front of the vehicle can be detected as an image. Then, based on the information of the image of the front camera 12, forward environment of the vehicle such as a traffic lane is detected. Then, the course generation apparatus 50 outputs a result of approximating the front lane line, which can be seen from the vehicle, with a polynomial or a spline curve and an Rsc that indicates the reliability of the approximated result. It may be allowed that the environmental information reliability Rsc is obtained from an error between image-information data and a polynomial or a spline curve at a time when the approximation is performed with the polynomial or the spline curve. It may also be allowed that the environmental information reliability Rsc is calculated based on the certainty of identification of an object such as a lane line obtained from the image. In some cases, when the traffic is congested, the sight line of the front camera 12 is obstructed by surrounding vehicles and hence the lane line can be neither photographed nor identified. It may be allowed that the environmental information reliability Rsc is calculated based on such a zone where a lane line cannot be identified or such a time in which a lane line cannot be identified.

As described later, by integrally utilizing the GNSS sensor 9, the route generation unit 8, and the front camera 12, the course generation apparatus 50 can generate a course on which the vehicle should advance, based on respective information pieces from the GNSS sensor 9 and the front camera 12. The peripheral radars 13 are provided in such a way that the front side and the rear side of the vehicle can be detected. For example, the peripheral radars 13 are provided at the four corners of the vehicle. Then, the peripheral radar 13 irradiates a radio wave to the surroundings of the vehicle and detects a reflected wave of the foregoing radio wave so as to output the respective relative positions and relative speeds between itself and a dynamic target such as another vehicle around the vehicle and between itself and a static target such as a side wall. A LiDAR (Light Detection and Ranging) 24 detects a subject through scanning measurement utilizing a laser beam.

The lane-line and surrounding-environment detection by the front camera 12 and the peripheral radar 13, described in Embodiment 1, may further include detection by a peripheral camera, a front radar, and the like or may be replaced by them.

<Hardware Configurations of Course Generation Apparatus and Vehicle Control Apparatus>

Figure 2:
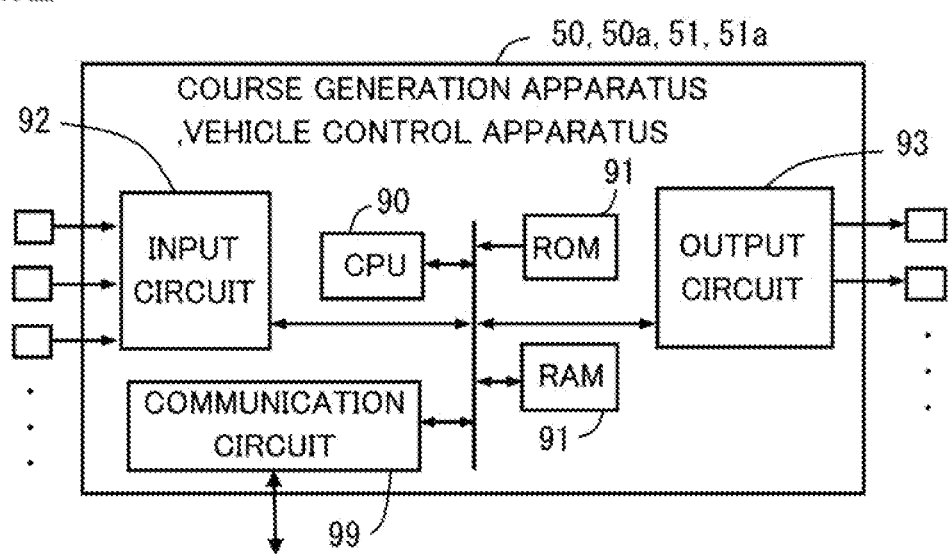
FIG. 2 is a hardware configuration diagram of the course generation apparatus and the vehicle control apparatus according to Embodiment 1.

FIG. 2 is a hardware configuration diagram of the course generation apparatus 50 and the vehicle control apparatus 51. The hardware configuration in FIG. 2 can be applied to a course generation apparatus 50a and a vehicle control apparatus 51a. Hereinafter, as the representative, the vehicle control apparatus 51 will be explained. In the present embodiment, the vehicle control apparatus 51 is an electronic control apparatus for realizing autonomous driving of the vehicle 20. Respective functions of the vehicle control apparatus 51 are realized by processing circuits provided in the vehicle control apparatus 51. Specifically, the vehicle control apparatus 51 includes, as the processing circuits, a computing processing unit (computer) 90 such as a CPU (Central Processing Unit), storage apparatuses 91 that exchange data with the computing processing unit 90, an input circuit 92 that inputs external signals to the computing processing unit 90, an output circuit 93 that outputs signals from the computing processing unit 90 to the outside, and the like.

It may be allowed that as the computing processing unit 90, an ASIC (Application Specific Integrated Circuit), an IC (Integrated Circuit), a DSP (Digital Signal Processor), an FPGA (Field Programmable Gate Array), each of various kinds of logic circuits, each of various kinds of signal processing circuits, or the like is provided. In addition, it may be allowed that as the computing processing unit 90, two or more computing processing units of the same type or different types are provided and respective processing items are executed in a sharing manner. As the storage apparatuses 91, there are provided a RAM (Random Access Memory) that can read data from and write data in the computing processing unit 90, a ROM (Read Only Memory) that can read data from the computing processing unit 90, and the like. As the storage apparatus 91, a nonvolatile or volatile semiconductor memory such as a flash memory, an EPROM, or an EEPROM, a magnetic disk, a flexible disk, an optical disk, a compact disk, a minidisk, a DVD, or the like may be utilized. The input circuit 92 is connected with various kinds of sensors, switches, and communication lines, including the output signals of the vehicle speed sensor 10, the gyroscopic sensor 11, the steering angle sensor 14, the steering torque sensor 15, the acceleration sensor 18, the front camera 12, the peripheral radar 13, the GNSS sensor 9, and the user interface 25, and is provided with an A/D converter, a communication circuit, and the like for inputting the output signals from these sensors and switches and communication information to the computing processing unit 90. The output circuit 93 is provided with a driving circuit and the like for outputting control signals from the computing processing unit 90 to apparatuses including the steering control apparatus 6. The computing processing unit 90 can communicate with external apparatuses through a communication unit 99.

The computing processing unit 90 executes software items (programs) stored in the storage apparatus 91 such as a ROM and collaborates with other hardware devices in the vehicle control apparatus 51, such as the storage apparatus 91, the input circuit 92, and the output circuit 93, so that the respective functions provided in the vehicle control apparatus 51 are realized. Setting data items such as a threshold value and a determination value to be utilized in the vehicle control apparatus 51 are stored, as part of software items (programs), in the storage apparatus 91 such as a ROM. It may be allowed that the respective functions included in the vehicle control apparatus 51 are configured with either software modules or combinations of software and hardware.

In the case where the computing processing unit 90 is the one that executes a program stored in an external memory or the like, it may be allowed that the function of the vehicle control apparatus 51 is realized by software of a type in which an execution program, through which a program stored in the storage apparatus is executed by the processing circuit, is loaded on a RAM, by firmware in which a program is fixed in a ROM, or a combination of the software and the firmware.

<Examples of Forking and Merging>

Figure 3:
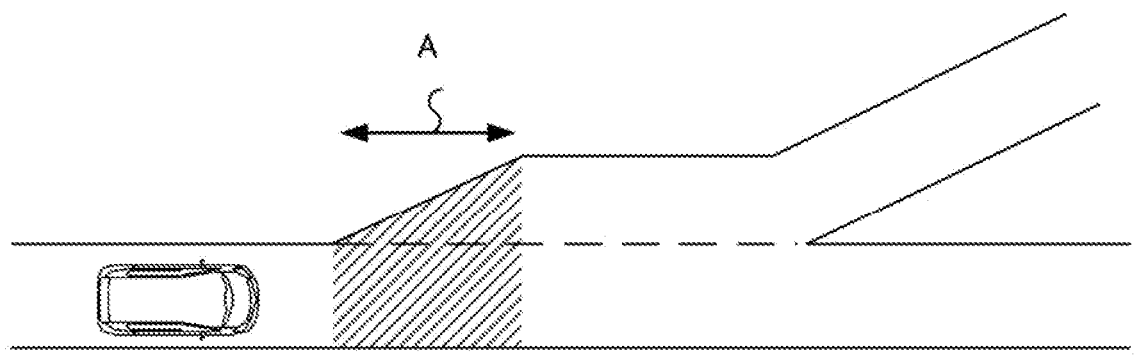
FIG. 3 is an explanatory view for an example of a forking zone where a lane-line detection by a camera, according to Embodiment 1, becomes unstable.
Figure 4:
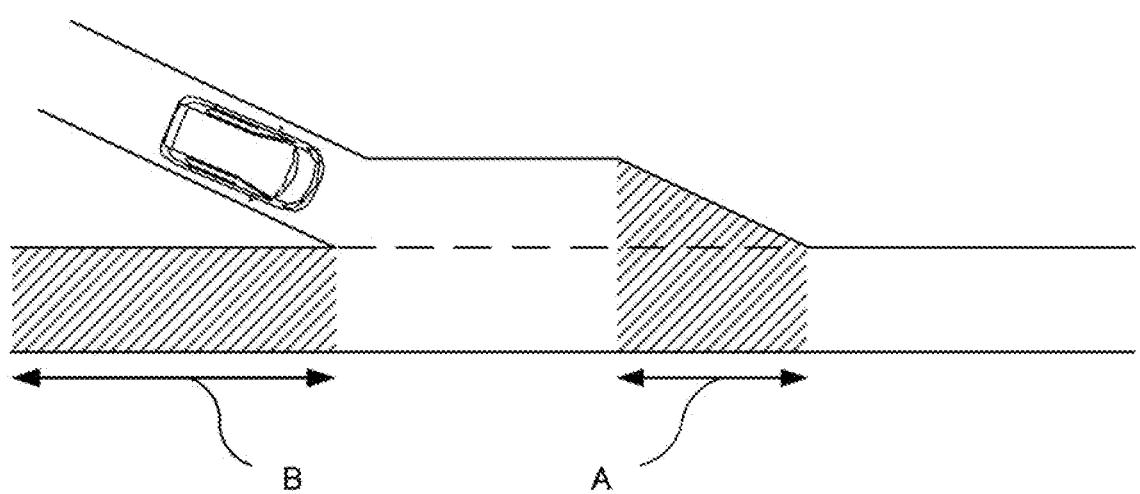
FIG. 4 is an explanatory view for an example of a merging zone where the lane-line detection by the camera, according to Embodiment 1, becomes unstable.

FIG. 3 illustrates an example of a forking zone where lane-line detection by a camera, according to Embodiment 1, becomes unstable. FIG. 4 illustrates an example of a merging zone where lane-line detection by a camera, according to Embodiment 1, becomes unstable.

As illustrated in a hatched zone A in each of FIGS. 3 and 4, in a place where the lane lines at a time of forking or merging are not parallel to each other, lane-line detection by the front camera 12 may become unstable. That is because in some cases, the main lane cannot be distinguished from the forking lane or the merging lane. Moreover, also when a vehicle enters a merging lane, there exists a case where the main-lane detection cannot be performed by the front camera 12, due to an obstacle or the like between the main lane and the merging lane in a hatched zone B in FIG. 4. Furthermore, when a road is congested at a time of forking or merging, there occurs a case where the sight line is obstructed by surrounding vehicles and hence the lane line cannot be detected.

In such situations, a route-information course Cr that is calculated by the course generation apparatus 50 based on map node data and the output of the GNSS sensor 9 becomes a course stabler than an environmental information course Ce that is calculated by the course generation apparatus 50 based on lane-line information detected by the front camera 12. Hereinafter, there will be explained a method in which the course generation apparatus 50 detects approach to a forking lane or a merging lane on a traveling route and then, in the zone, gives priority to and selects the route-information course Cr based on the GNSS sensor 9, as the course.

<Functions of Respective Blocks>

Figure 5A:
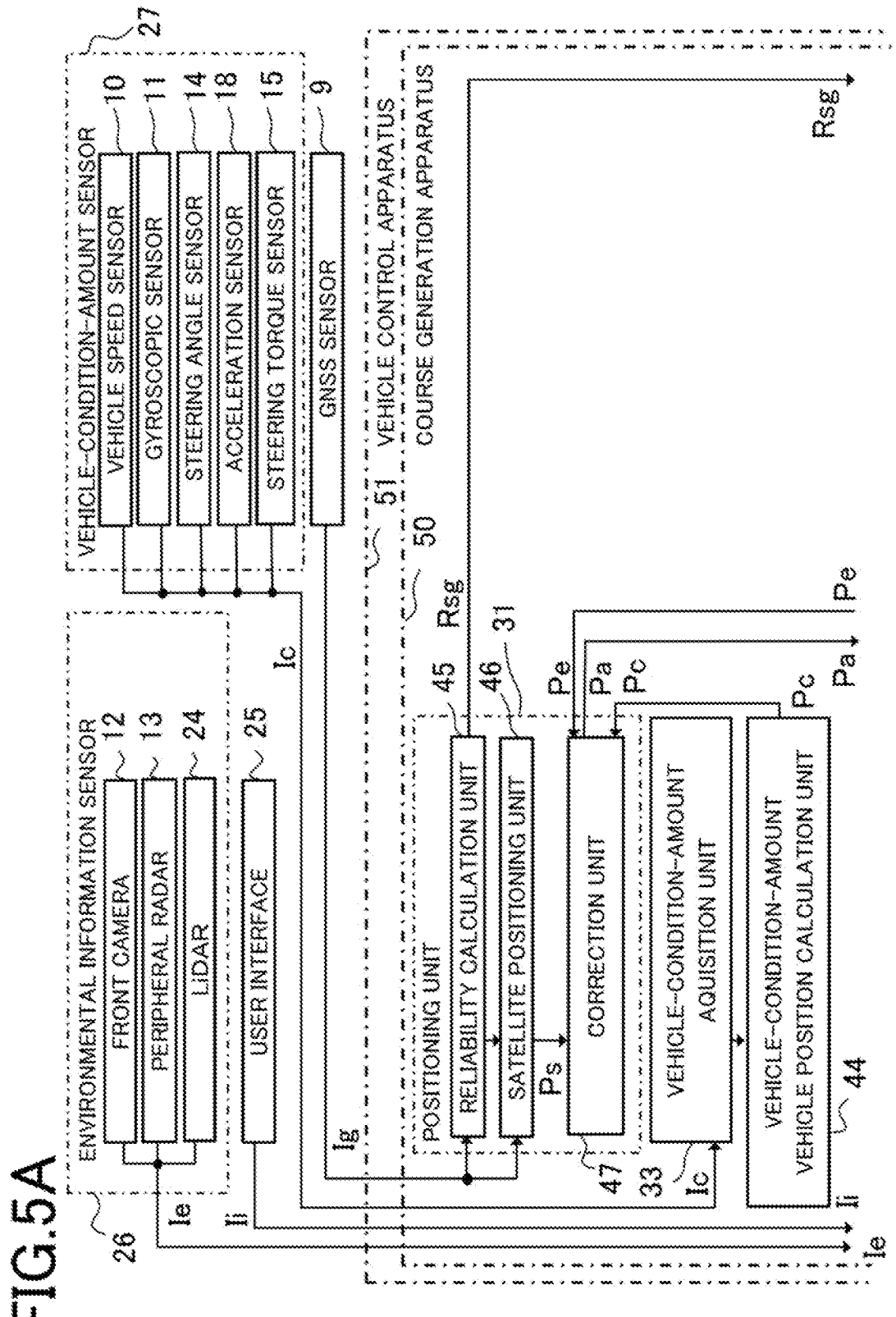
FIG. 5A is a first half of a block diagram of the course generation apparatus and the vehicle control apparatus according to Embodiment 1.
Figure 5B:
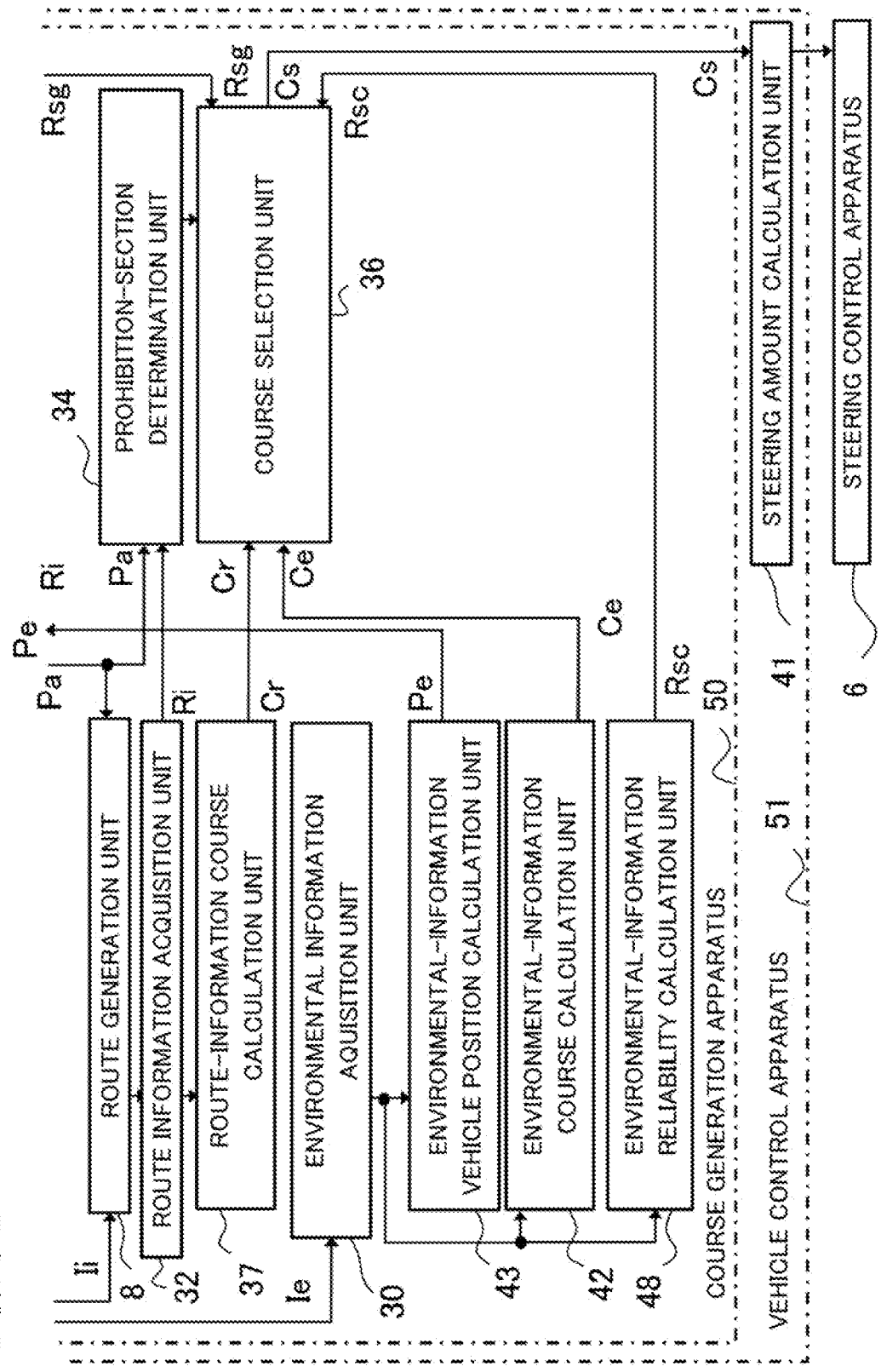
FIG. 5B is a second half of the block diagram of the course generation apparatus and the vehicle control apparatus according to Embodiment 1.

FIGS. 5A and 5B are a first half and a second half of a block diagram of the course generation apparatus 50 and the vehicle control apparatus 51 according to Embodiment 1. The course generation apparatus 50 outputs a course on which the vehicle should advance; a steering amount is calculated based on the course; then, the vehicle control apparatus 51 issues an instruction on the steering amount to the steering control apparatus 6. As a result, the vehicle 20 is autonomously driven.

An environmental information sensor 26 is a generic name of each of sensors, such as the front camera 12, the peripheral radar 13, and LiDAR 24, for detecting external environment. The environmental information sensor 26 transmits environmental information Ie to an environmental information acquisition unit 30. The environmental information Ie is utilized to detect the distance from a vehicle to a lane line and the distance from a vehicle to a terrestrial object such as a side wall or a guard rail. An c 43 can calculate an environmental-information vehicle position Pe, which is a vehicle-position estimation value, from the environmental information Ie.

A positioning unit 31 has a function of positioning a vehicle position, based on the output of the GNSS sensor 9. The positioning unit 31 is provided with a reliability calculation unit 45, a satellite positioning unit 46, and a correction unit 47. Based on the output of the GNSS sensor 9, the reliability calculation unit 45 calculates the satellite-positioning reliability Rsg of GNSS-sensor output information. Moreover, the correction unit 47 has a function of correcting a satellite vehicle position Ps, obtained from the output of the GNSS sensor 9, by the environmental-information vehicle position Pe and a vehicle-condition-amount vehicle position Pc, calculated from the outputs of the environmental information sensor 26 and a vehicle-condition-amount sensor 27, respectively.

A route information acquisition unit 32 has a function of acquiring a forward traveling route and map node data of the vehicle 20, i.e., route information Ri from the route generation unit 8. Based on the route information Ri and a corrected vehicle position Pa, a route-information course calculation unit 37 calculates the route-information course Cr.

The vehicle-condition-amount sensor 27 is a generic name of each of sensors, such as the vehicle speed sensor 10, the gyroscopic sensor 11, the steering angle sensor 14, and the acceleration sensor 18, for indicating a vehicle condition. The vehicle-condition-amount sensor 27 detects a vehicle condition amount Ic of a vehicle; then, a vehicle-condition-amount acquisition unit 33 acquires the vehicle condition amount Ic. The vehicle-condition-amount vehicle position calculation unit 44 utilizes the vehicle condition amount Ic so as to calculate the vehicle-condition-amount vehicle position Pc. The vehicle-condition-amount vehicle position Pc is a vehicle-position estimation value obtained from the vehicle condition amount Ic.

Based on the corrected vehicle position Pa outputted from the positioning unit 31 and a route outputted from the route information acquisition unit 32, a prohibition-section determination unit 34 determines approach to a forking starting point or a merging starting point. For example, based on the section type of the route information Ri (forward map node data) and the road shape, the map coordinates of a forking starting point or a merging starting point is specified; then, it is determined whether or not the vehicle position is approaching the foregoing point and whether or not vehicle position is passing through a forking completion point or a merging completion point.

Based on the corrected vehicle position Pa outputted from the positioning unit 31, traveling-route information outputted from the route information acquisition unit 32, and the route information Ri (forward map node data), the prohibition-section determination unit 34 determines a forking pattern or a merging pattern on the traveling route. In the case of forking, it is determined whether or not the route enters the forking lane from the main lane at a most proximal forking point on the traveling route. In the case of merging, it is determined whether or not the route enters the main lane from the merging lane at a most proximal merging point on the traveling route.

The prohibition-section determination unit 34 outputs a selection prohibition signal during a period from a time when the vehicle 20 approaches a forking starting point or a merging starting point to a time when the vehicle 20 passes through the forking completion point or the merging completion point. In accordance with the selection prohibition signal, a course selection unit 36 selects only the route-information course Cr, without selecting the environmental information course Ce based on the environmental information Ie that has been acquired by the environmental information acquisition unit 30 from the environmental information sensor 26. In a normal time in which it does not receive the selection prohibition signal from the prohibition-section determination unit 34, the course selection unit 36 selects, as a course on which the vehicle should advance, any one of the route-information course Cr and the environmental information course Ce.

The course selection unit 36 selects the route-information course Cr based on the output value of the GNSS sensor 9 or the environmental information course Ce based on the output value of the front camera 12. In the case of forking, when the vehicle is approaching a forking point and is on a route entering from the main lane into the forking lane, the course selection unit 36 selects the route-information course Cr based on the output value of the GNSS sensor 9 and maintains the state of selection until the forking is completed. In the case of merging, when the vehicle is approaching a merging point and is on a route entering from the merging lane into the main lane, the course selection unit 36 selects the route-information course Cr based on the output value of the GNSS sensor 9 and maintains the state of selection until the merging is completed. Each of these periods in each of which in the case of forking or merging, the course selection unit 36 maintains the state of selecting the route-information course Cr will be referred to as an environmental-information-course usage prohibition section. This is because selection of the environmental information course Ce is prohibited in the foregoing section. In the case where in this section, the satellite-positioning reliability Rsg becomes the same as or lower than a predetermined determination reliability, the satellite vehicle position Ps may be corrected by the environmental-information vehicle position Pe. This is because when the reliability of the satellite vehicle position Ps is deteriorated, the environmental-information vehicle position Pe can compensate the deterioration. In the case where in this section, the satellite-positioning reliability Rsg becomes the same as or lower than a predetermined second determination reliability, the satellite vehicle position Ps may be corrected by the vehicle-condition-amount vehicle position Pc. This is because when the reliability of the satellite vehicle position Ps is deteriorated, the vehicle-condition-amount vehicle position Pc can compensate the deterioration.

In the case of neither forking nor merging, the course selection unit 36 selects a higher-reliability course out of the route-information course Cr based on the output value of the GNSS sensor 9 and the environmental information course Ce based on the output value of the front camera 12. It may be allowed that the course selection unit 36 compares the satellite-positioning reliability Rsg calculated by the reliability calculation unit 45 with the environmental information reliability Rsc calculated by an environmental-information reliability calculation unit 48 and then selects a higher-reliability course.

Alternatively, the course selection unit 36 may select a course by use of a distance (i.e., a lateral deviation) between the center of a lane and a vehicle detected by any one of the sensors such as the peripheral camera, the front radar, and the LiDAR 24. The course selection unit 36 may select any one, of the route-information course Cr based on the output value of the GNSS sensor 9 and the environmental information course Ce based on the output value of the front camera 12, that is closer to the vehicle calculated based on information of a sensor other than the front camera 12 and the lane-center course.

Based on a selected course Cs selected by the course selection unit 36, a steering-amount calculation unit 41 calculates a target steering amount for following the course. As the calculation method for the target steering angle, there can be utilized a publicly known calculation method such as a calculation method based on feedback of a forward-viewpoint lateral deviation, a calculation method based on MPC (Model Predictive Control), or the like. The steering-amount calculation unit 41 transfers the calculated steering amount to the steering control apparatus 6, so that steering control of the vehicle 20 is performed.

Hereinafter, there will be explained a method in which the course generation apparatus 50 generates a course, by use of the respective output values obtained from the GNSS sensor 9 and the front camera 12.

<Generation of Course Based on Route Information>

FIG. 6 is a flowchart representing processing in which based on the route information Ri, the course generation apparatus 50 according to Embodiment 1 generates the route-information course Cr on which the vehicle 20 should advance. The processing in FIG. 6 is implemented every predetermined time (for example, every 1 ms). The processing may be implemented not every predetermined time but at each external event such as input of a vehicle-speed-sensor signal or reception of data of the GNSS sensor.

In the step ST100 after the start of the processing, the satellite positioning unit 46 in the positioning unit 31 calculates the satellite vehicle position Ps from an output value Ig of the GNSS sensor 9. In the present embodiment, it is assumed that data of the satellite vehicle position Ps additionally includes information on the posture of the vehicle (the azimuth to which the vehicle is oriented). Then, the reliability calculation unit calculates the satellite-positioning reliability Rsg. The correction unit 47 corrects the satellite vehicle position Ps by the environmental-information vehicle position Pe and the vehicle-condition-amount vehicle position Pc that are obtained through other calculation methods, so that the corrected vehicle position Pa is calculated.

The correction by the environmental-information vehicle position Pe and the vehicle-condition-amount vehicle position Pc may be replaced by modification based on a deviation between the satellite vehicle position Ps and the environmental-information vehicle position Pe and a deviation between the satellite vehicle position Ps and the vehicle-condition-amount vehicle position Pc. Alternatively, in the case where the satellite vehicle position Ps is not reliable, it may be allowed that the satellite vehicle position Ps is not utilized and that the vehicle position is replaced by the environmental-information vehicle position Pe, the vehicle-condition-amount vehicle position Pc, or the composite value thereof. In this situation, the satellite-positioning reliability Rsg indicates the estimation accuracy of positioning obtained in a process of positioning calculation.

In the step ST101, based on the corrected vehicle position Pa obtained in the step ST100, matching processing with road information stored in the route generation unit 8 is performed so as to find out map node data for a position that is near and in front of the vehicle.

In the step ST102, the route information acquisition unit 32 acquires, as the route information Ri, information on the forward route of the corrected vehicle position Pa among traveling routes on the map to the destination.

In the step ST103, from the route information Ri, the route-information course calculation unit 37 extracts a course on which the vehicle should advance, as a row of points on the map. Then, by use of the posture of the vehicle (the advancing azimuth) obtained in the step ST100, the row of points on the map is transformed into a vehicle coordinate system.

In the step ST104, the route-information course calculation unit 37 approximates the row of points on the map with a polynomial or a spline curve. As a result, a course Cr on which the vehicle should advance (i.e., a course, on which the vehicle should advance, in the center of a specific lane of the road or a course at a time when the lane is changed) is calculated.

In Embodiment 1, it is assumed that the course obtained in the step ST104 is expressed by a cubic polynomial; for example, each of the values of Cg0, Cg1, Cg2, and Cg3 in the equation (1) below is outputted as a course on which the vehicle should advance (i.e., a lane-center course on which the vehicle should advance).

$$yb = Cg3 \cdot xb^3 + Cg2 \cdot xb^2 + Cg1 \cdot xb + Cg0 \qquad (1)$$

As an apparatus for generating a path, there exists a locator. A locator has a function of calculating a traveling route in accordance with the destination of a driver (an operator) and a function of accurately estimating a vehicle position by integrally utilizing a GNSS sensor, a gyroscopic sensor, and a vehicle speed sensor.

These functions of a locator can be utilized. Specifically, a path based on a GNSS sensor can be generated by storing map node data in the locator. Accordingly, course generation, described in in Embodiment 1, in which a GNSS sensor and a navigation device are integrally utilized, may be an output of a locator.

<Generation of Course Based on Environmental Information>

There will be explained a procedure in which an environmental-information course calculation unit 42 calculates the environmental information course Ce, based on the environmental information Ie that is acquired by the environmental information acquisition unit 30 from the environmental information sensor 26. There will be described a case where as environmental information, image data of the front camera 12 is utilized.

It may be allowed that the environmental-information course calculation unit 42 calculates the environmental information course Ce from environmental information other than the image data of the front camera 12. It may be allowed that a course of advancing in the center of a road is calculated by detecting the side wall of a road and the position of a guard rail from information pieces of the peripheral radar 13 and the LiDAR 24.

The lane lines at the left and the right of the vehicle, recognized from the image data of the front camera 12, are expressed by parameters of a cubic curve. This cubic curve is outputted from the environmental-information course calculation unit 42. In this situation, right-lane-line information is expressed by the equation (2) below; the environmental-information course calculation unit 42 outputs the respective values of Ccr0, Ccr1, Ccr2, and Ccr3 in the equation (2) below.

$$yb = Ccr3 \cdot xb^3 + Ccr2 \cdot xb^2 + Ccr1 \cdot xb + Ccr0 \quad (2)$$

Left-lane-line information is expressed by the equation (3) below; the environmental-information course calculation unit 42 outputs the respective values of Ccl0, Ccl1, Ccl2, and Ccl3 in the equation (3) below.

$$yb = Ccl3 \cdot xb^3 + Ccl2 \cdot xb^2 + Ccl1 \cdot xb + Ccl0 \quad (3)$$

In this case, the course on which the vehicle should advance (i.e., the lane-center course) is expressed by the equation (4) below. The course expressed by the equation (4) is the environmental information course Ce.

$$yb = Cc3 \cdot xb^3 + Cc2 \cdot xb^2 + Cc1 \cdot xb + Cc0 \quad (4)$$

Cc0, Cc1, Cc2, and Cc3 satisfy the following relationship among them.

$$Cc3 = (Ccr3 + Ccl3)/2 \quad (5)$$
$$Cc2 = (Ccr2 + Ccl2)/2$$
$$Cc1 = (Ccr1 + Ccl1)/2$$
$$Cc0 = (Ccr0 + Ccl0)/2$$

<Selection of Course>

The route-information course calculation unit 37 outputs the route-information course Cr based on the output value of the GNSS sensor 9. Then the environmental-information course calculation unit 42 outputs the environmental information course Ce based on the output value of the front camera 12. The course selection unit 36 selects the course on which the vehicle should advance out of these courses and then outputs it, as the selected course Cs.

When the courses are changed, the course selection unit 36 needs to prevent the vehicle from becoming unstable due to a sudden change in the course. Thus, it may be allowed that the selected course Cs is outputted by use of Co0, Co1, Co2, and Co3, as the parameters of a cubic curve, among which the respective sensor-value reflection degrees are gradually changed.

Co0, Co1, Co2, and Co3 satisfy the relationship among them; a has a value of 0 through 1. When the course based on the output value of the GNSS sensor 9 is switched to the course based on the output value of the front camera 12, a is made to gradually change from 1 to 0 in a predetermined time. When the course based on the output value of the front camera 12 is switched to the course based on the output value of the GNSS sensor 9, α is made to gradually change from 0 to 1 in a predetermined time. Such switching makes it possible to smoothly switch the courses without any level difference.

$$Co3 = Cg3 \cdot \alpha + Cc3 \cdot (1 - \alpha) \quad (6)$$
$$Co2 = Cg2 \cdot \alpha + Cc2 \cdot (1 - \alpha)$$
$$Co1 = Cg1 \cdot \alpha + Cc1 \cdot (1 - \alpha)$$
$$Co0 = Cg0 \cdot \alpha + Cc0 \cdot (1 - \alpha)$$

<Operation of Course Generation Apparatus at a Time of Forking>

Figure 7B:
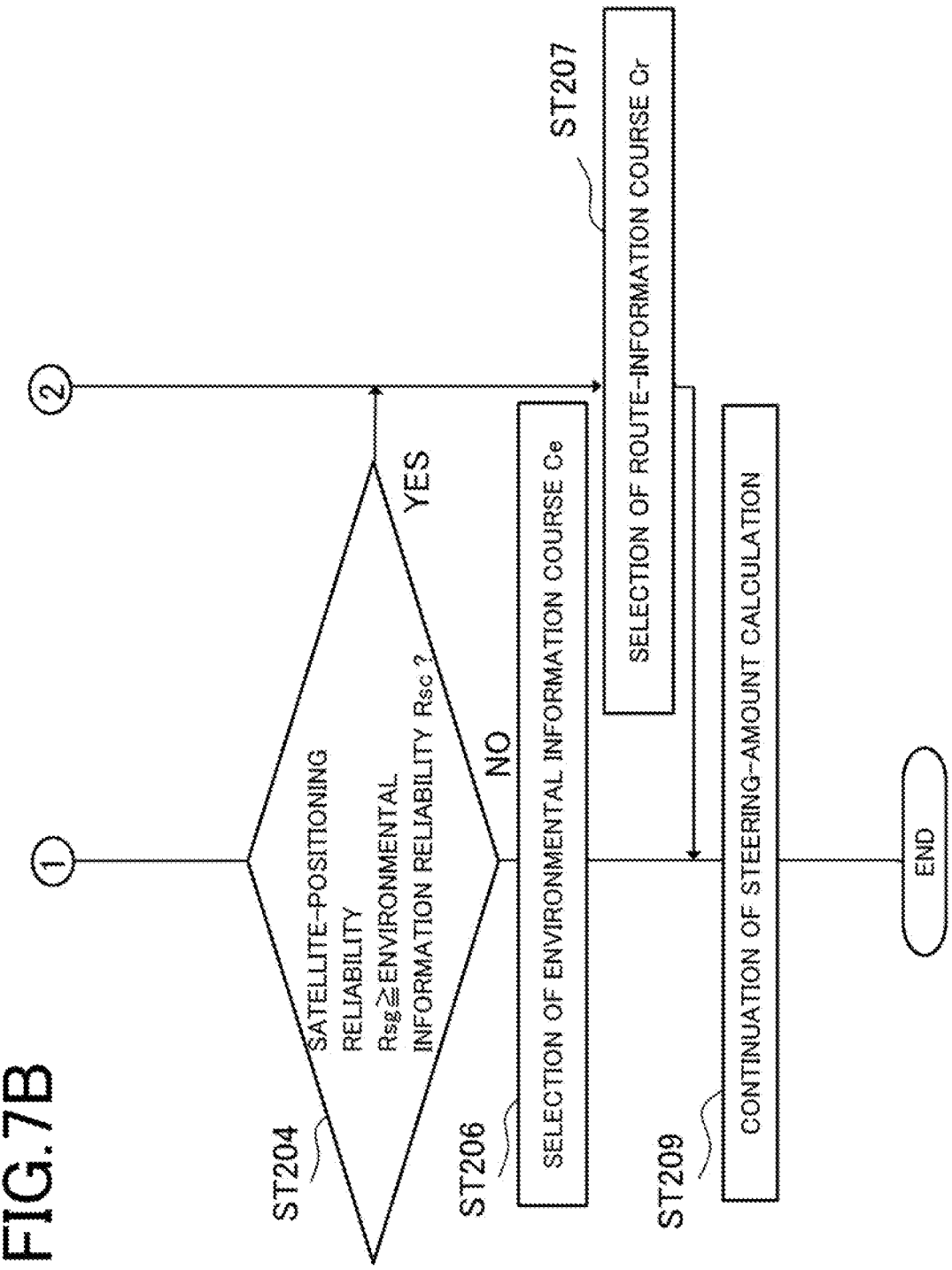
FIG. 7B is a second half of the flowchart representing processing, according to Embodiment 1, for generating the course on which the vehicle should advance at the forking timing.

FIGS. 7A and 7B are a first half and a second half of a flowchart representing processing in which the course generation apparatus 50 according to Embodiment 1 generates a course on which the vehicle 20 should advance at a time of forking. The flowchart in FIGS. 7A and 7B is implemented every predetermined time (for example, every 1 ms). The processing may be implemented not every predetermined time but at each external event such as input of a vehicle-speed-sensor signal or reception of data of the GNSS sensor. Alternatively, the processing in FIGS. 7A and 7B may constantly be implemented.

In the step ST200 after the start of the processing, the prohibition-section determination unit 34 determines whether the corrected vehicle position Pa is at a position in the vicinity of a forking starting point or in the process of forking. In the case of YES, the step ST200 is followed by the step ST201; in the case of NO, the step ST200 is followed by the step ST204. In this situation, whether or not the corrected vehicle position Pa is in the vicinity of the forking starting point may be determined based on whether or not the corrected vehicle position Pa has passed through the vicinity of the forking starting point. It may also be allowed that whether or not the corrected vehicle position Pa is in the vicinity of the forking starting point is determined based on whether or not the corrected vehicle position Pa has passed through a point that is before the forking starting point by a predetermined distance. The predetermined distance can be determined from a spare time in the course selection by the course generation apparatus 50 and may also be determined based on the traveling speed of the vehicle 20. This method makes it possible that the course generation apparatus 50 performs the course selection in good time and hence it can contribute to enhancement of the reliability.

In the step ST201, the prohibition-section determination unit 34 determines whether or not the forking from the main lane is set on the route information Ri of a route on which the vehicle should travel. In the case of YES, the step ST201 is followed by the step ST203; in the case of NO, the step ST201 is followed by the step ST204.

In the step ST203, based on map node information (forward route information) Ri and the corrected vehicle position Pa, the prohibition-section determination unit 34 determines whether or not the vehicle has passed through the forking completion point and hence the forking has been completed. In the case of NO, the step ST203 is followed by the step ST207. In the case of YES, the step ST203 is followed by the step ST204.

In the step ST204, because the present section is not the environmental-information-course usage prohibition section caused by forking from the main lane, the course selection unit 36 selects any one of the route-information course Cr based on the output value of the GNSS sensor 9 and the environmental information course Ce based on the output value of the front camera 12. In the present embodiment, the course to be selected is determined by comparing the respective reliabilities of the foregoing courses. It is determined whether or not the satellite-positioning reliability Rsg, which is a barometer indicating the reliability of the route-information course Cr, is the same as or larger than the environmental information reliability Rsc indicating the reliability of the environmental information course Ce. In the case of YES, the step ST204 is followed by the step ST207; in the case of NO, the step ST204 is followed by the step ST206.

In the step ST206, the course selection unit 36 selects the environmental information course Ce based on the output value of the front camera 12 and then outputs it, as the selected course Cs, to the steering-amount calculation unit 41. The environmental information course Ce is a course that is generated by the environmental-information course calculation unit 42, based on lane-line information detected by a camera.

After that, in the step ST209, the course selection unit 36 continues issuing the instruction of steering-amount calculation to the steering-amount calculation unit 41. Then, the foregoing processing is ended.

In the step ST207, the course selection unit 36 selects the route-information course Cr. The route-information course Cr is a course generated by the route-information course calculation unit 37, based on the forward map node information (the route information Ri) and the vehicle position (the corrected vehicle position Pa). After that, the step ST207 is followed by the step ST209.

<Operation of Course Generation Apparatus at a Time of Merging>

Figure 8A:
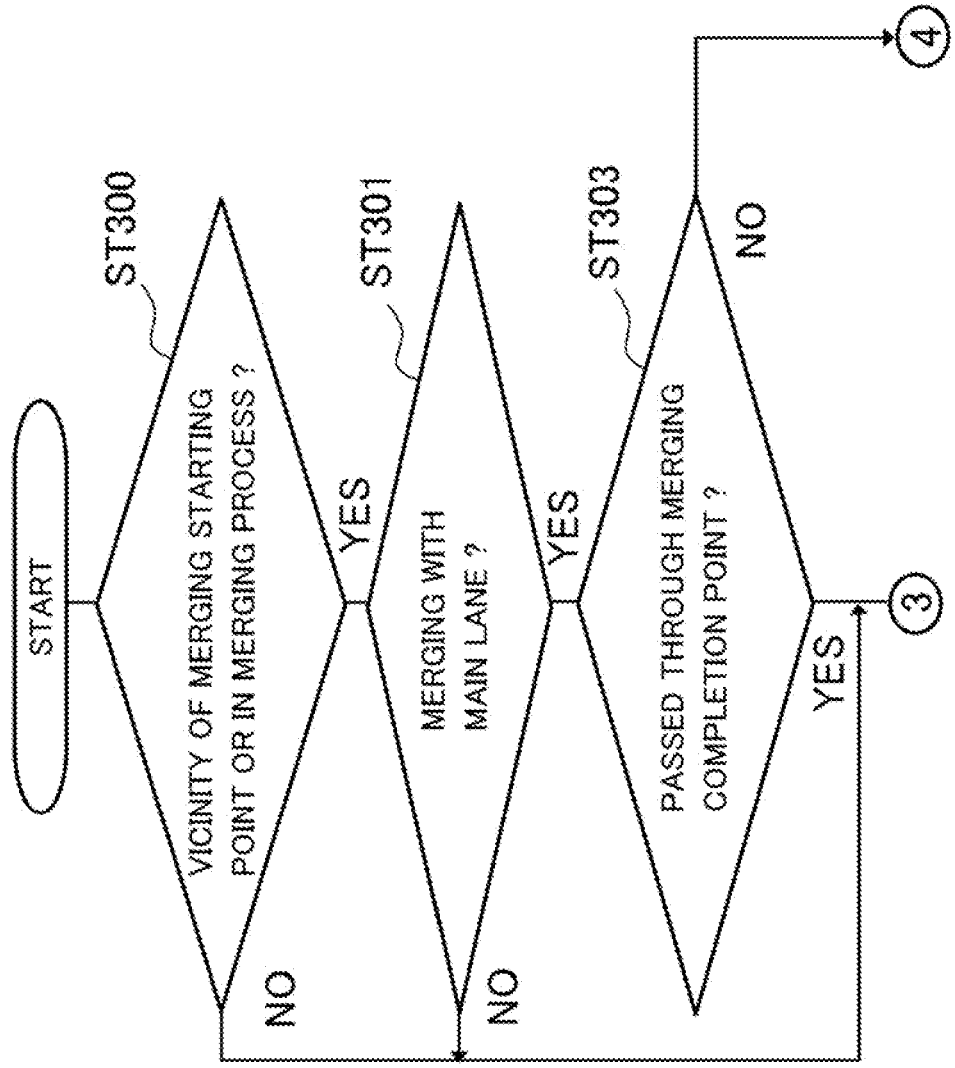
FIG. 8A is a first half of a flowchart representing processing, according to Embodiment 1, for generating a course on which a vehicle should advance at a merging timing.

FIGS. 8A and 8B are a first half and a second half of a flowchart representing processing in which the course generation apparatus 50 according to Embodiment 1 generates a course on which the vehicle 20 should advance at a time of merging. The flowchart in FIGS. 8A and 8B is implemented every predetermined time (for example, every 1 ms). The processing may be implemented not every predetermined time but at each external event such as input of a vehicle-speed-sensor signal or reception of data of a GNSS sensor. Alternatively, the processing in FIGS. 8A and 8B may constantly be implemented.

In the step ST300 after the start of the processing, the prohibition-section determination unit 34 determines whether the corrected vehicle position Pa is at a position in the vicinity of a merging starting point or in the process of merging. In the case of YES, the step ST300 is followed by the step ST301; in the case of NO, the step ST300 is followed by the step ST304. In this situation, whether or not the corrected vehicle position Pa is in the vicinity of the merging starting point may be determined based on whether or not the corrected vehicle position Pa has passed through the vicinity of the merging starting point. It may also be allowed that whether or not the corrected vehicle position Pa is in the vicinity of the merging starting point is determined based on whether or not the corrected vehicle position Pa has passed through a point that is before the merging starting point by a predetermined second distance. The predetermined second distance can be determined from a spare time in the course selection by the course generation apparatus 50 and may also be determined based on the traveling speed of the vehicle 20. This method makes it possible that the course generation apparatus 50 performs the course selection in good time and hence it can contribute to enhancement of the reliability.

In the step ST301, the prohibition-section determination unit 34 determines whether or not the merging with the main lane is set on the route information Ri of a route on which the vehicle should travel. In the case of YES, the step ST301 is followed by the step ST303; in the case of NO, the step ST301 is followed by the step ST304.

In the step ST303, based on map node information (forward route information) Ri and the corrected vehicle position Pa, the prohibition-section determination unit 34 determines whether or not the vehicle has passed through the merging completion point and hence the merging has been completed. In the case of NO, the step ST303 is followed by the step ST307. In the case of YES, the step ST303 is followed by the step ST304.

In the step ST304, because the present section is not the environmental-information-course usage prohibition section caused by merging with the main lane, the course selection unit 36 selects any one of the route-information course Cr based on the output value of the GNSS sensor 9 and the environmental information course Ce based on the output value of the front camera 12. In the present embodiment, the course to be selected is determined by comparing the respective reliabilities of the foregoing courses. It is determined whether or not the satellite-positioning reliability Rsg, which is a barometer indicating the reliability of the route-information course Cr, is the same as or larger than the environmental information reliability Rsc indicating the reliability of the environmental information course Ce. In the case of YES, the step ST304 is followed by the step ST307; in the case of NO, the step ST304 is followed by the step ST306.

In the step ST306, the course selection unit 36 selects the environmental information course Ce based on the output value of the front camera 12 and then outputs it, as the selected course Cs, to the steering-amount calculation unit 41. The environmental information course Ce is a course that is generated by the environmental-information course calculation unit 42, based on lane-line information detected by a camera.

After that, in the step ST309, the course selection unit 36 continues issuing the instruction of steering-amount calculation to the steering-amount calculation unit 41. Then, the foregoing processing is ended.

In the step ST307, the course selection unit 36 selects the route-information course Cr. The route-information course Cr is a course generated by the route-information course calculation unit 37, based on the forward map node information (the route information Ri) and the vehicle position (the corrected vehicle position Pa). After that, the step ST307 is followed by the step ST309.

As described above, the course generation apparatus 50 according to Embodiment 1 makes it possible that for example, in a place where the lane lines at a time of forking or merging are not parallel to each other or in the case where when a vehicle enters a merging lane, there exists an obstacle between the main lane and the merging lane, lane-line detection by the front camera 12 is prevented from becoming unstable. The route-information course Cr is preliminarily generated based on the output value of the GNSS sensor 9, so that before a vehicle reaches a merging point or a forking point and hence lane-line detection by the front camera 12 becomes unstable, it is made possible that a stable course is generated and the vehicle advances on that. Moreover, the situation where due to traffic congestion at a forking point or a merging point, other vehicle makes the lane-line detection by the front camera 12 difficult can be dealt with.

In the vehicle control apparatus 51 provided with the course generation apparatus 50 according to Embodiment 1, it is made possible that a course at a time of forking or merging is stably generated and hence the steering-amount calculation unit 41 stable calculates a steering amount. As a result, stable autonomous driving can be performed.

2. Embodiment 2

Figure 9A:
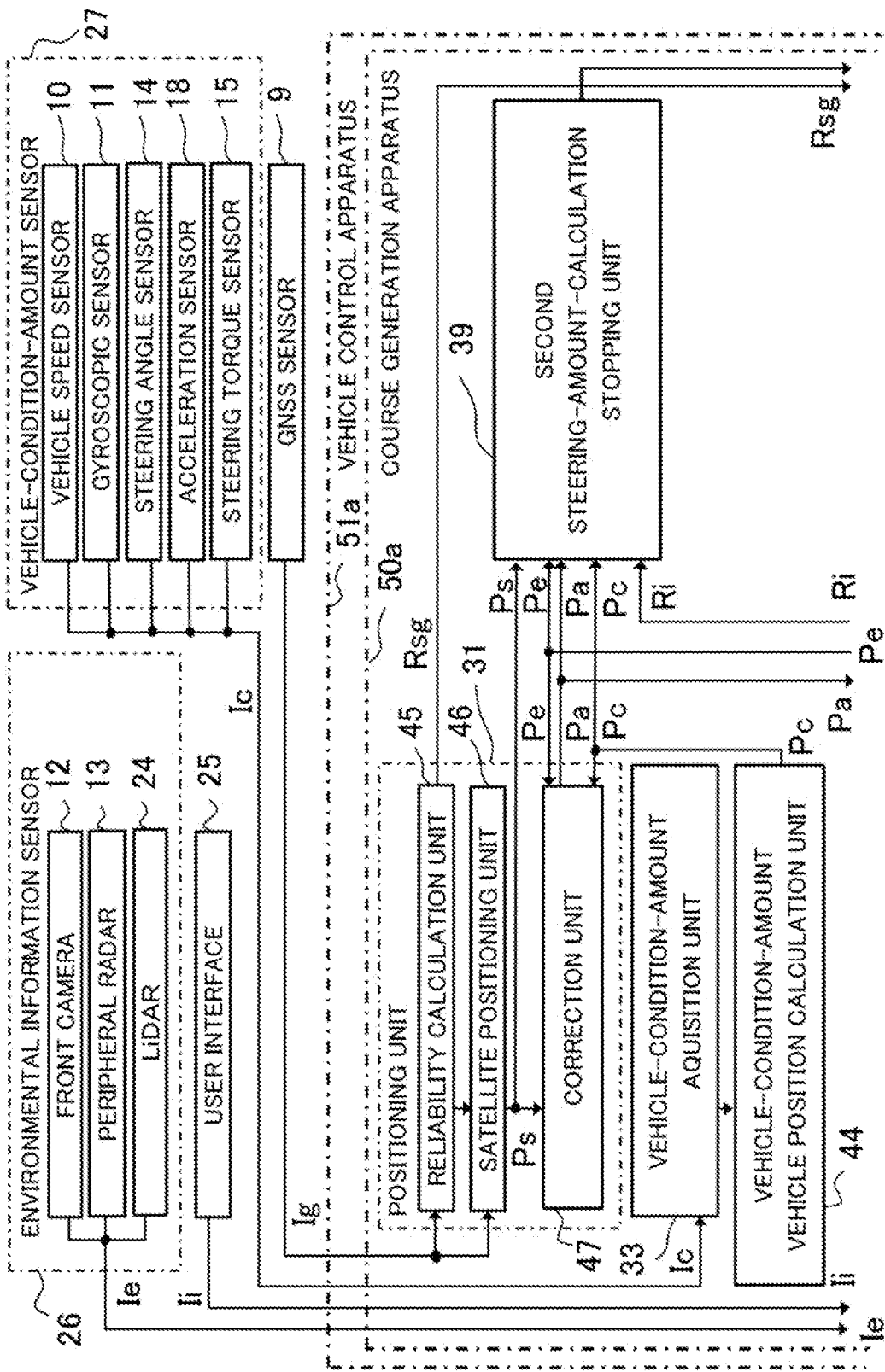
FIG. 9A is a first half of a block diagram of a course generation apparatus and a vehicle control apparatus according to Embodiment 2.
Figure 9B:
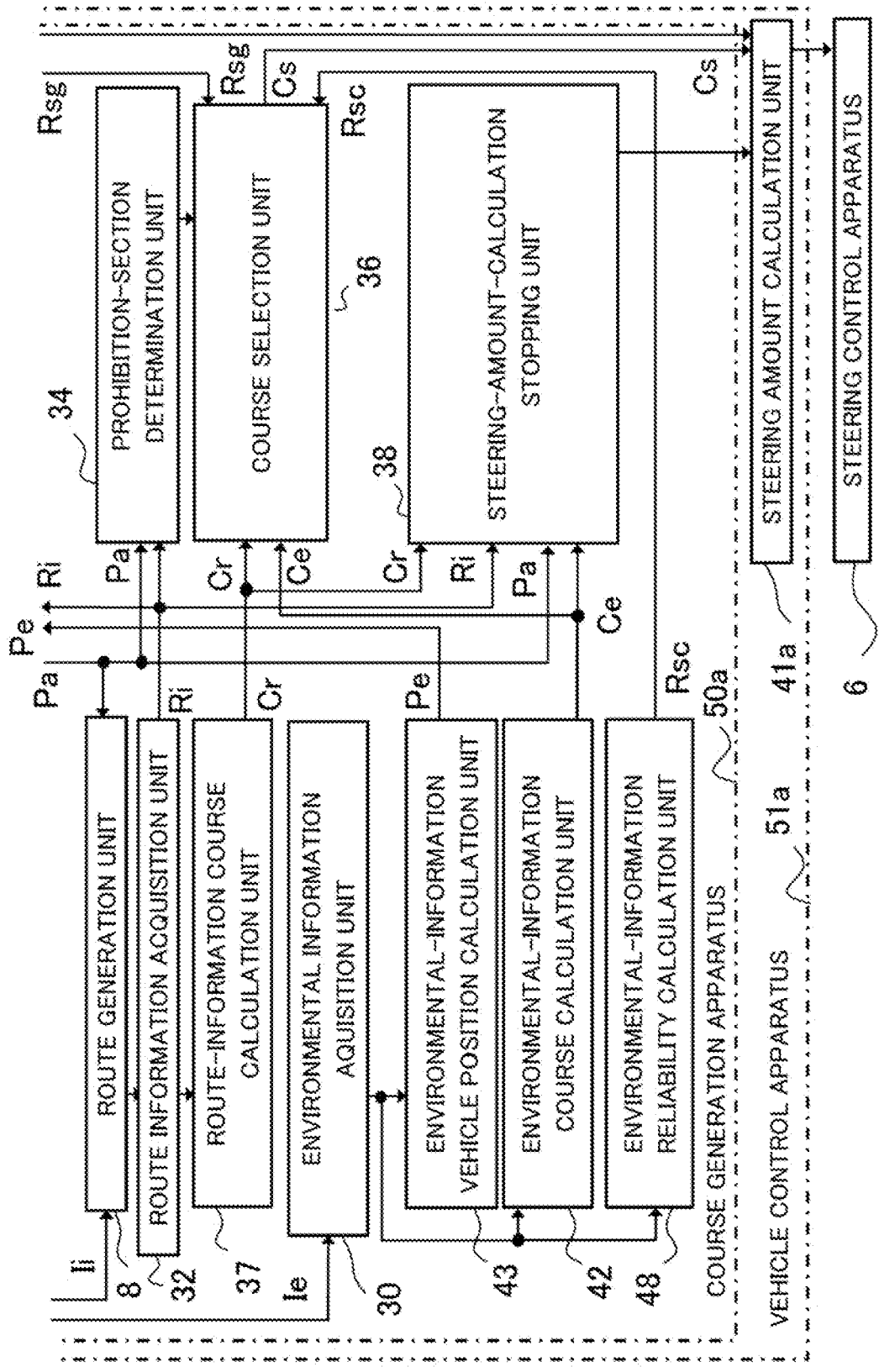
FIG. 9B is a second half of the block diagram of the course generation apparatus and the vehicle control apparatus according to Embodiment 2.

FIGS. 9A and 9B are a first half and a second half of a block diagram of a course generation apparatus 50a and a vehicle control apparatus 51a according to Embodiment 2. The course generation apparatus 50a and the vehicle control apparatus 51a according to Embodiment 2 are different from the course generation apparatus 50 and the vehicle control apparatus 51 according to Embodiment 1 in that a steering-amount-calculation stopping unit 38 and a second steering-amount-calculation stopping unit 39 are provided. When determining that the reliability of the course generation by the course generation apparatus 50a has been deteriorated, the steering-amount-calculation stopping unit 38 or the second steering-amount-calculation stopping unit 39 transmits a calculation stopping instruction to the steering-amount calculation unit 41a. Because having a function of receiving the calculation stopping instruction, the steering-amount calculation unit 41a is different from the steering-amount calculation unit 41 in FIGS. 5A and 5B according to Embodiment 1.

<Steering-Amount-Calculation Stopping Unit>

When the vehicle approaches a forking point or a merging point, the steering-amount-calculation stopping unit 38 determines whether or not a course based on the output value of the GNSS sensor 9 can be generated. As a determination method, in the case where the difference between the environmental information course Ce based on the output value of the front camera 12 and the route-information course Cr obtained from the output of the GNSS sensor 9 and the route information Ri exceeds a predetermined steering stopping determination value, a steering-amount-calculation stopping instruction is outputted.

The difference between the route-information course Cr and the environmental information course Ce signifies the magnitude of a distance in the case where the respective course coordinates of both of them at each time are apart from each other in such a way as to exceed a predetermined distance. In the case where the rows of points indicating these courses are apart from each other in such a way as to exceed a predetermined distance, i.e., Cr and Ce are apart from each other, it is conceivable that one of or both of the courses are abnormal; therefore, it can be determined that the reliability of the course generation by the course generation apparatus 50a has been deteriorated. In this case, stopping calculation of the steering amount results in stopping autonomous steering control. In other words, the autonomous driving is canceled.

As a determination standard for the steering-amount-calculation stopping unit 38 to issue an instruction of stopping calculation of steering amount, a determination based on the satellite-positioning reliability Rsg calculated by the reliability calculation unit 45 may be performed. In the case where a state where the satellite-positioning reliability Rsg of the GNSS sensor 9 is lower than a predetermined value continues for a predetermined time, it is determined that course generation based on the output value of the GNSS sensor 9 cannot be performed. In this situation, because the control utilizing the signal of the GNSS sensor 9 has a problem, it may be allowed that calculation of a steering amount is stopped and the autonomous driving is canceled.

The steering-amount calculation unit 41a that has received the instruction of stopping calculation of a steering amount from the steering-amount-calculation stopping unit 38 stops the steering control apparatus 6 from performing autonomous steering control. In this situation, in the case where a correction coefficient that can have a value of 0 through 1 is calculated and it is determined that course generation by the course generation apparatus 50a has a problem, the correction coefficient is gradually decreased from 1 to 0. Multiplying the correction coefficient and a current for making the steering angle calculated by the steering control apparatus 6 follow a target steering angle, so that the autonomous steering control is gradually stopped.

It may be allowed that the output of the steering-amount-calculation stopping unit 38 is not only the instruction of stopping calculation of a steering amount to the steering-amount calculation unit 41a but also a direct instruction of stopping the autonomous steering control or canceling the autonomous driving mode.

<Operation of Vehicle Control Apparatus>

Figure 10A:
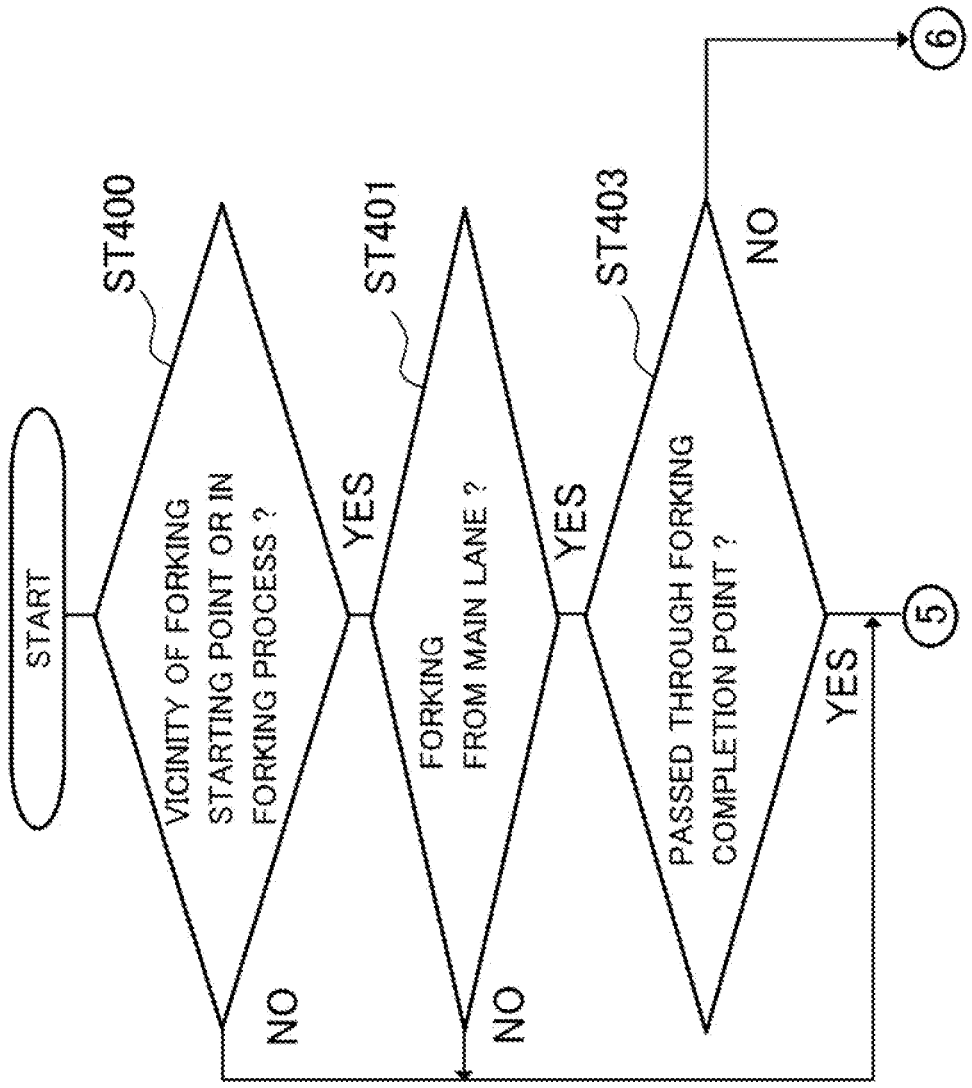
FIG. 10A is a first half of a first flowchart representing processing, according to Embodiment 2, for stopping steering-amount calculation at a forking timing.
Figure 10B:
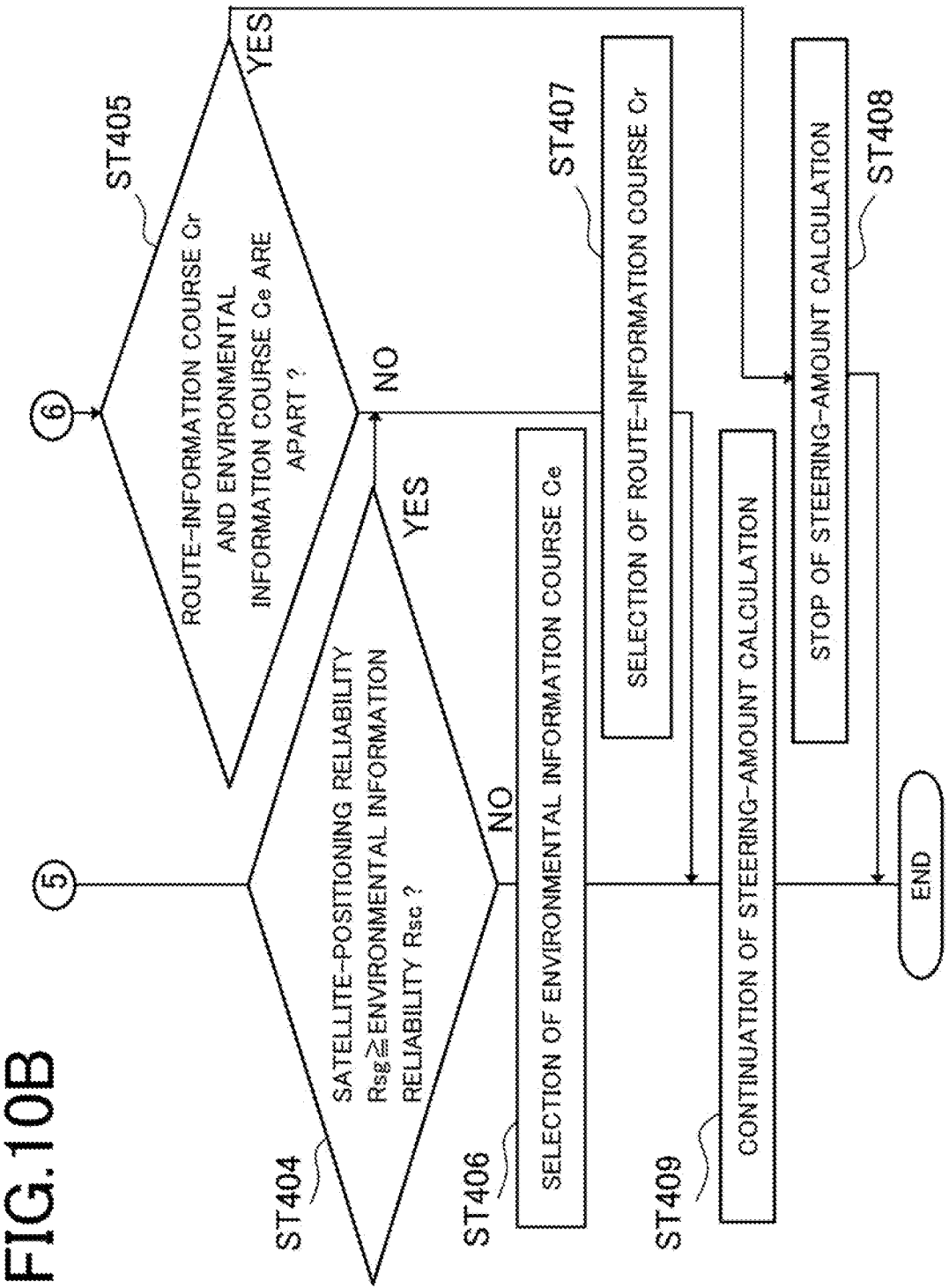
FIG. 10B is a second half of the first flowchart representing processing, according to Embodiment 2, for stopping steering-amount calculation at the forking timing.

FIGS. 10A and 10B are a first half and a second half of a first flowchart representing processing in which the vehicle control apparatus 51a according to Embodiment 2 stops steering-amount calculation at a time of forking. In the case where the route-information course Cr and the environmental information course Ce are apart from each other, it is determined that course generation has a problem; then, steering-amount calculation is stopped so that autonomous steering control is stopped. Hereinafter, based on this flowchart, there will be explained processing in which when a vehicle approaches a forking point and course generation cannot be performed, the steering-amount calculation is stopped.

The flowchart in FIGS. 10A and 10B is implemented every predetermined time (for example, every 1 ms). The processing may be implemented not every predetermined time but at each external event such as input of a vehicle-speed-sensor signal or reception of data of the GNSS sensor. Alternatively, the processing in FIGS. 10A and 10B may constantly be implemented.

Because the steps ST400, ST401, ST404, ST406, and ST407 in FIGS. 10A and 10B according to Embodiment 2 are the same as the steps ST200, ST201, ST204, ST206, and ST207, respectively, in FIGS. 7A and 7B according to Embodiment 1, the explanations therefor will be omitted.

In the step ST403, the prohibition-section determination unit 34 determines whether or not the vehicle 20 has passed through a forking completion point and hence the forking has been completed. In the case of NO, the step ST403 is followed by the step ST405. In the case of YES, the step ST403 is followed by the step ST404.

In the step ST405, the steering-amount-calculation stopping unit 38 determines whether or not the route-information course Cr and the environmental information course Ce are apart from each other. In the case where the rows of points indicating these courses are apart from each other in such a way as to exceed a predetermined steering stopping determination value, it is determined that Cr and Ce are apart from each other. In the case of YES, the step ST405 is followed by the step ST408; in the case of NO, the step ST405 is followed by the step ST407, where the course selection unit 36 selects the route-information course Cr; then, the step ST407 is followed by the step ST409.

In the step ST408, the steering-amount-calculation stopping unit 38 transmits an instruction of stopping steering-amount calculation to the steering-amount calculation unit 41a. The steering-amount calculation unit 41a gradually decreases a correction coefficient for stopping the steering control from 1 to 0, multiplies the steering amount to be outputted to the steering control apparatus 6 by the correction coefficient, and outputs the multiplication result, so that the autonomous steering control is stopped. Then, the foregoing processing is ended.

In the step ST409, the steering-amount-calculation stopping unit 38 does not issue the instruction of stopping steering-amount calculation. The steering-amount calculation unit 41a sets the correction coefficient, by which the steering amount to be outputted to the steering control apparatus 6 is multiplied, to 1 and outputs it; thus, the steering-amount calculation unit 41a continues normal steering-amount calculation so as to maintain the autonomous steering control. Then, the foregoing processing is ended.

Figure 11A:
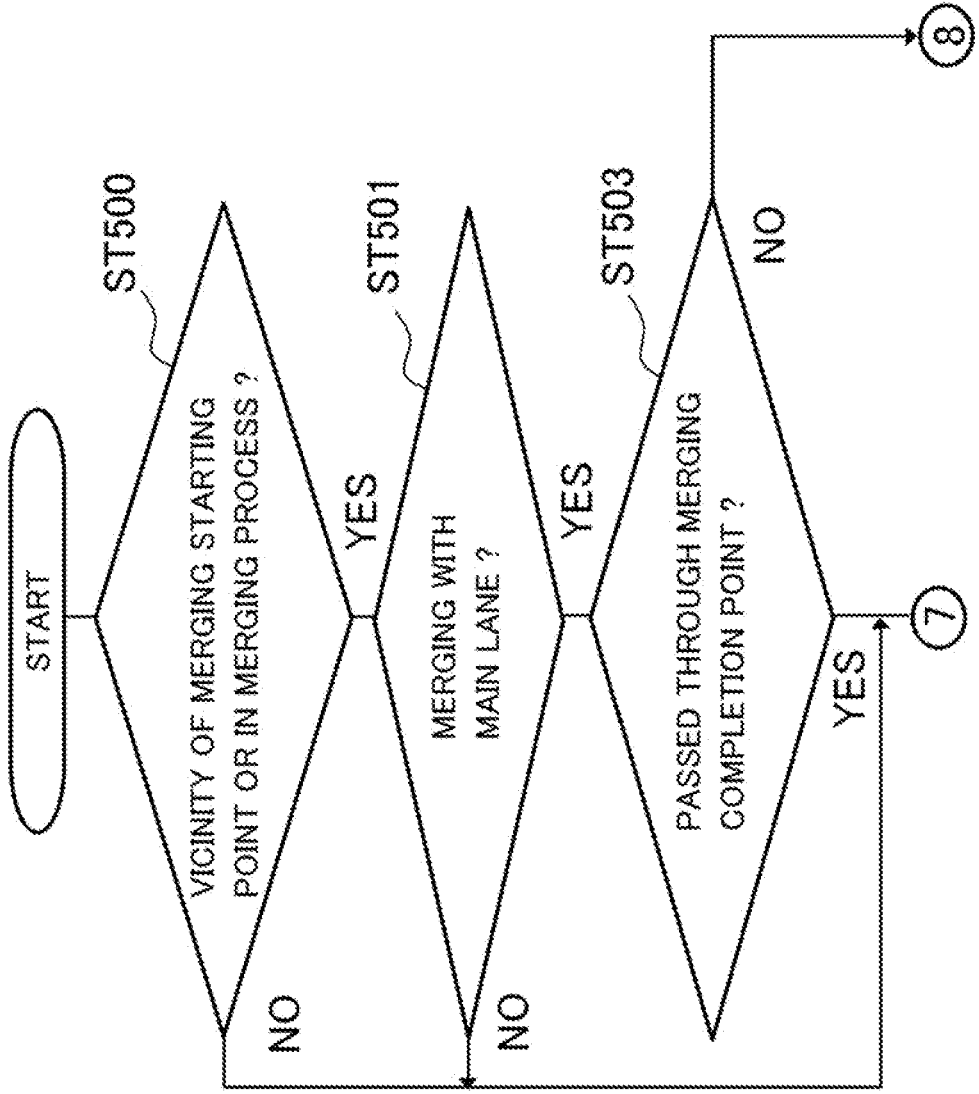
FIG. 11A is a first half of a first flowchart representing processing, according to Embodiment 2, for stopping steering-amount calculation at a merging timing.

FIGS. 11A and 11B are a first half and a second half of a first flowchart representing processing in which the vehicle control apparatus 51a according to Embodiment 2 stops steering-amount calculation at a time of merging. In the case where the route-information course Cr and the environmental information course Ce are apart from each other, it is determined that course generation has a problem; then, steering-amount calculation is stopped so that autonomous steering control is stopped. Hereinafter, based on this flowchart, there will be explained processing in which when a vehicle approaches a merging point and course generation cannot be performed, the steering-amount calculation is stopped.

The flowchart in FIGS. 11A and 11B is implemented every predetermined time (for example, every 1 ms). The processing may be implemented not every predetermined time but at each external event such as input of a vehicle-speed-sensor signal or reception of data of the GNSS sensor. Alternatively, the processing in FIGS. 11A and 11B may constantly be implemented.

Because the steps ST500, ST501, ST504, ST506, and ST507 in FIGS. 11A and 11B according to Embodiment 2 are the same as the steps ST300, ST301, ST304, ST306, and ST307, respectively, in FIGS. 8A and 8B according to Embodiment 1, the explanations therefor will be omitted.

In the step ST503, the prohibition-section determination unit 34 determines whether or not the vehicle 20 has passed through a merging completion point and hence the merging has been completed. In the case of NO, the step ST503 is followed by the step ST505. In the case of YES, the step ST503 is followed by the step ST504.

In the step ST505, the steering-amount-calculation stopping unit 38 determines whether or not the route-information course Cr and the environmental information course Ce are apart from each other. In the case where the rows of points indicating these courses are apart from each other in such a way as to exceed a predetermined steering stopping determination value, it is determined that Cr and Ce are apart from each other. In the case of YES, the step ST505 is followed by the step ST508; in the case of NO, the step ST505 is followed by the step ST507, where the course selection unit 36 selects the route-information course Cr; then, the step ST507 is followed by the step ST509.

In the step ST508, the steering-amount-calculation stopping unit 38 transmits an instruction of stopping steering-amount calculation to the steering-amount calculation unit 41a. The steering-amount calculation unit 41a gradually decreases a correction coefficient for stopping the steering control from 1 to 0, multiplies the steering amount to be outputted to the steering control apparatus 6 by the correction coefficient, and outputs the multiplication result, so that the autonomous steering control is stopped. Then, the foregoing processing is ended.

In the step ST509, the steering-amount-calculation stopping unit 38 does not issue the instruction of stopping steering-amount calculation. The steering-amount calculation unit 41a sets the correction coefficient, by which the steering amount to be outputted to the steering control apparatus 6 is multiplied, to 1 and outputs it; thus, the steering-amount calculation unit 41a continues normal steering-amount calculation so as to maintain the autonomous steering control. Then, the foregoing processing is ended.

As described above, in the vehicle control apparatus 51a according to Embodiment 2, it is monitored whether or not the route-information course Cr and the environmental information course Ce are apart from each other in the section from a position before a forking point to the forking completion point or from a position before a merging point to the merging completion point. This makes it possible that when course generation has a problem, the steering-amount calculation is stopped and hence the autonomous steering control is stopped. That is to say, it is made possible to prevent the autonomous steering control from being continued while the error of the generated route-information course Cr is left large.

<Second Steering-Amount-Calculation Stopping Unit>

In the case where when the vehicle approaches a forking point or a merging point, the distance between the satellite vehicle position Ps based on the output value of the GNSS sensor 9 and the environmental-information vehicle position Pe based on the output value of the environmental information sensor 26 is larger than a predetermined steering stopping distance or the distance between the satellite vehicle position Ps based on the output value of the GNSS sensor 9 and the vehicle-condition-amount vehicle position Pc based on the output value of the vehicle-condition-amount sensor 27 is larger than a predetermined steering stopping distance, the second steering-amount-calculation stopping unit 39 outputs an instruction of stopping steering-amount calculation. In this case, stopping calculation of the steering amount results in stopping autonomous steering control. In other words, the autonomous driving is canceled.

It may be allowed that the comparison between a positioning value obtained by the GNSS sensor 9 and a positioning value obtained by a sensor other than the GNSS sensor 9 is performed by comparing the three courses, i.e., Cg0 (i.e., the lateral deviation between the road center and the vehicle) of the route-information course Cr based on the output value of the GNSS sensor 9, Cc0 of the course based on the output value of the front camera 12, and Ca0 (the lateral deviation between the road center and the vehicle) of the course based on the output value detected by a peripheral camera, a LiDAR, or the like, which is a sensor other than the GNSS sensor 9 (Ca0 is represented neither in a drawing nor in an equation). It may be allowed that when a state where only Cg0 of the course based on the output value of the GNSS sensor 9 is different from each of Cc0 and Ca0 of the respective courses obtained by the other sensors in such a way that the difference exceeds a predetermined value continues for a predetermined time or when a state where Cg0, Cc0, Ca0 are different from one another in such a way that each of the differences exceeds a predetermined value continues for a predetermined time, it is determined that course generation based on the output value of the GNSS sensor 9 cannot be performed.

Moreover, it may be allowed that by use of a vehicle trajectory estimation means, a vehicle position is obtained through sensors. The vehicle trajectory of a vehicle is calculated based on information pieces obtained from the GNSS sensor 9, the environmental information sensor 26, and the vehicle-condition-amount sensor 27.

With regard to vehicle trajectory calculation through the environmental information sensor 26, a lane-line detection result of the front camera 12 is compared with lane-line information included in map node data and a road edge such as a side wall or a guard rail, the information on which is obtained from the peripheral radar 13, is compared with road-edge information included in map node data, so that the vehicle position can be calculated from the vehicle trajectory of a vehicle.

With regard to vehicle trajectory calculation through the vehicle-condition-amount sensor 27, the yaw rate of the vehicle, the forward speed, and the like are obtained from the vehicle speed sensor 10, the gyroscopic sensor 11, the steering angle sensor 14, and the acceleration sensor 18 and then a traveling amount of the vehicle is calculated by use of a Kalman filter or the like, so that the vehicle trajectory of the vehicle can be calculated. The calculated vehicle trajectory is compared with the road shape included in the map node data, so that the vehicle position can be calculated.

These methods make it possible that based on information pieces obtained from the environmental information sensor 26 and the vehicle-condition-amount sensor 27, the vehicle trajectory is calculated and then the environmental-information vehicle position Pe and the vehicle-condition-amount vehicle position Pc are obtained. In the case where the distance between the satellite vehicle position Ps and the environmental-information vehicle position Pe or the vehicle-condition-amount vehicle position Pc is larger than a steering stopping distance, the second steering-amount-calculation stopping unit 39 can transfer an instruction of stopping steering-amount-calculation.

It may be allowed that the output of the second steering-amount-calculation stopping unit 39 is not only the instruction of stopping calculation of a steering amount to the steering-amount calculation unit 41a but also a direct instruction of stopping the autonomous steering control or canceling the autonomous driving mode.

<Operation of Vehicle Control Apparatus>

Figure 12A:
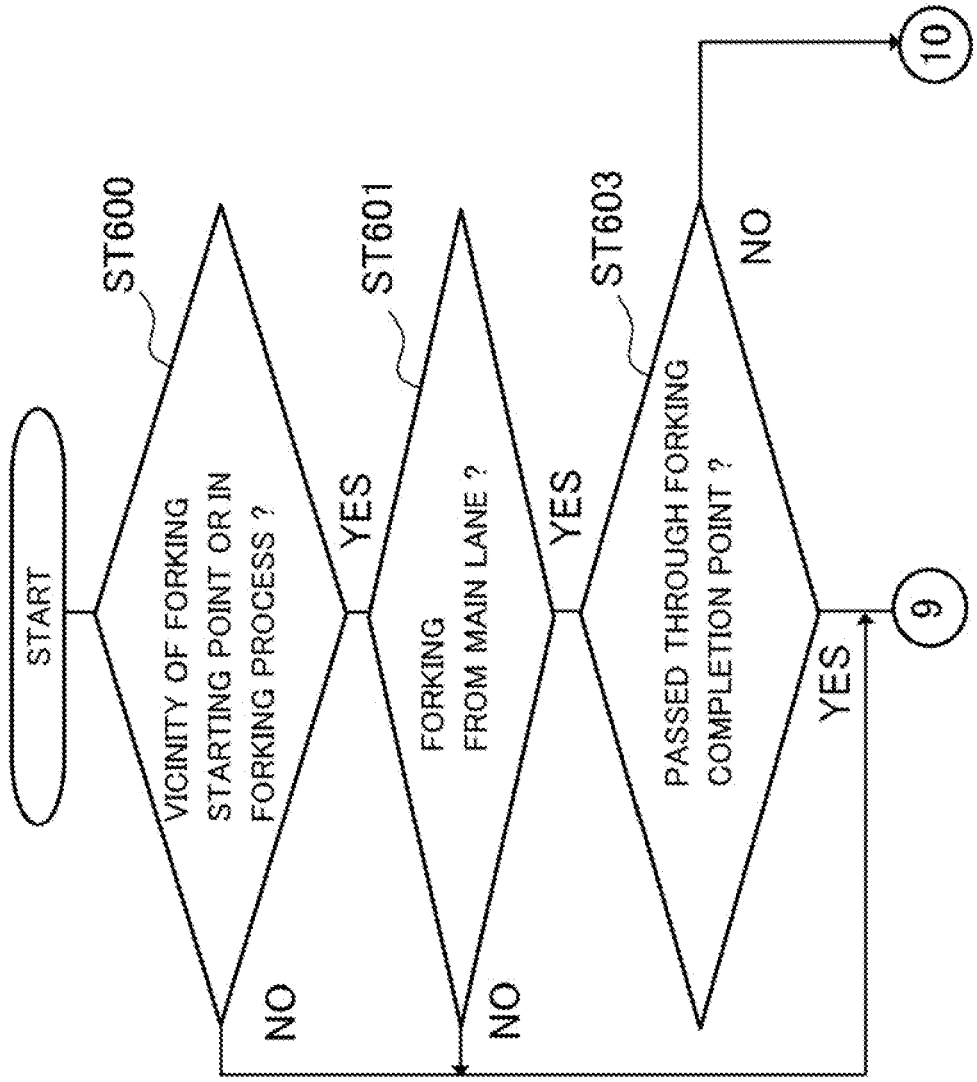
FIG. 12A is a first half of a second flowchart representing processing, according to Embodiment 2, for stopping steering-amount calculation at a forking timing.

FIGS. 12A and 12B are a first half and a second half of a second flowchart representing processing in which the vehicle control apparatus 51a according to Embodiment 2 stops steering-amount calculation at a time of forking. There is explained processing in a state where the route-information course Cr based on the output value of the GNSS sensor 9 is selected during a period from a time when the vehicle passes through a position before a forking point or the vicinity thereof to a time when the vehicle passes through the forking completion point. In the case where the distance between the satellite vehicle position Ps and the environmental-information vehicle position Pe or the vehicle-condition-amount vehicle position Pc is larger than a predetermined steering stopping distance, the second steering-amount-calculation stopping unit 39 determines that course generation cannot be performed and then makes the steering-amount calculation unit 41a stop steering-amount-calculation. Stopping calculation of the steering amount results in stopping autonomous steering control; that is to say, autonomous driving is canceled.

The flowchart in FIGS. 12A and 12B is implemented every predetermined time (for example, every 1 ms). The processing may be implemented not every predetermined time but at each external event such as input of a vehicle-speed-sensor signal or reception of data of the GNSS sensor. Alternatively, the processing in FIGS. 12A and 12B may constantly be implemented.

The processing in the steps ST600 through ST609 excluding the step ST605 in FIGS. 12A and 12B is the same as that in the steps ST400 through ST409 (excluding the step ST405) in FIGS. 10A and 10B according to Embodiment 2. In the present embodiment, the explanation therefor will be omitted.

In the step ST605, it is determined whether or not the satellite vehicle position Ps calculated based on the output value of the GNSS sensor 9 is appropriate. In the case where the distance between the satellite vehicle position Ps and the environmental-information vehicle position Pe or the vehicle-condition-amount vehicle position Pc is the same as or smaller than a steering stopping distance, the second steering-amount-calculation stopping unit 39 determines that the satellite vehicle position Ps is appropriate. In the case of YES, the step ST605 is followed by the step ST607; in the case of NO, the step ST605 is followed by the step ST608.

In the step ST608, the second steering-amount-calculation stopping unit 39 makes the steering-amount calculation unit 41a stop steering-amount calculation. The steering-amount calculation unit 41a gradually decreases a correction coefficient for stopping the steering control from 1 to 0, multiplies the steering amount to be outputted to the steering control apparatus 6 by the correction coefficient, and outputs the multiplication result, so that the autonomous steering control is stopped.

Figure 13A:
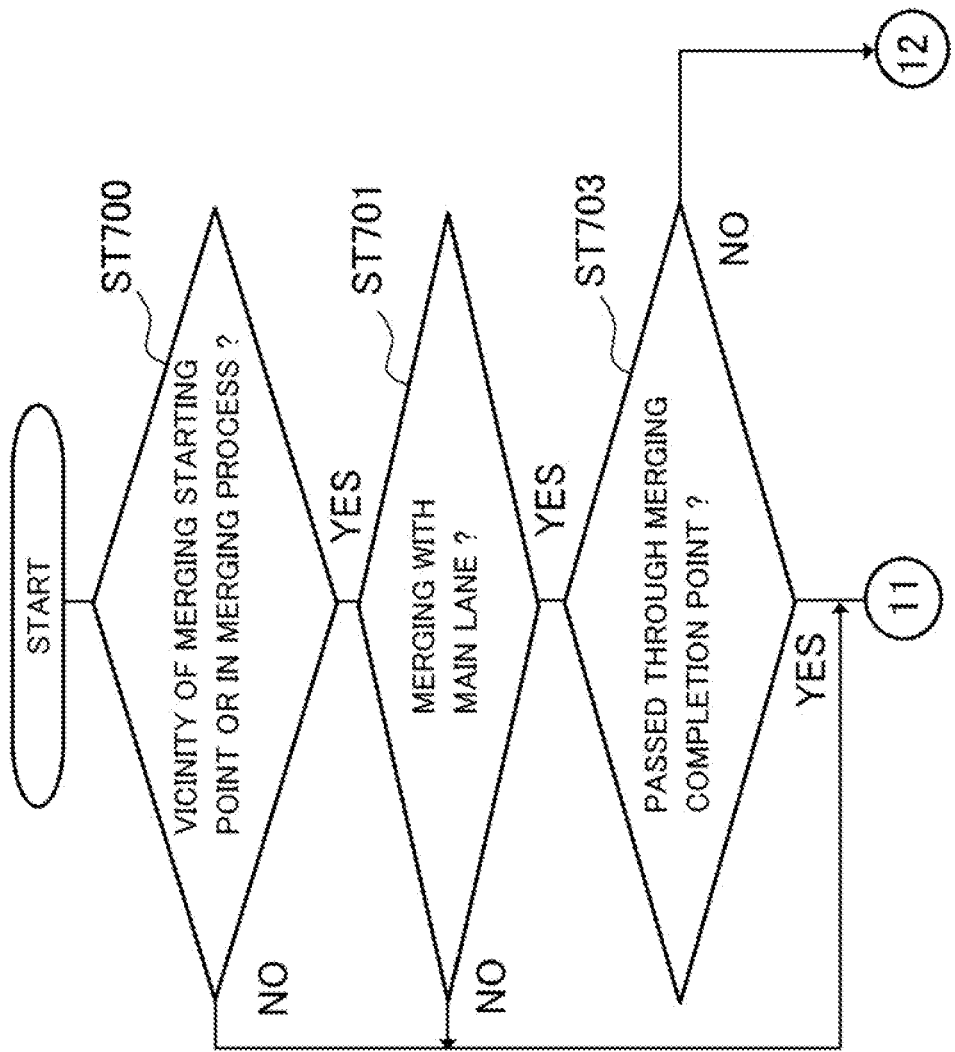
FIG. 13A is a first half of a second flowchart representing processing, according to Embodiment 2, for stopping steering-amount calculation at a merging timing.
Figure 13B:
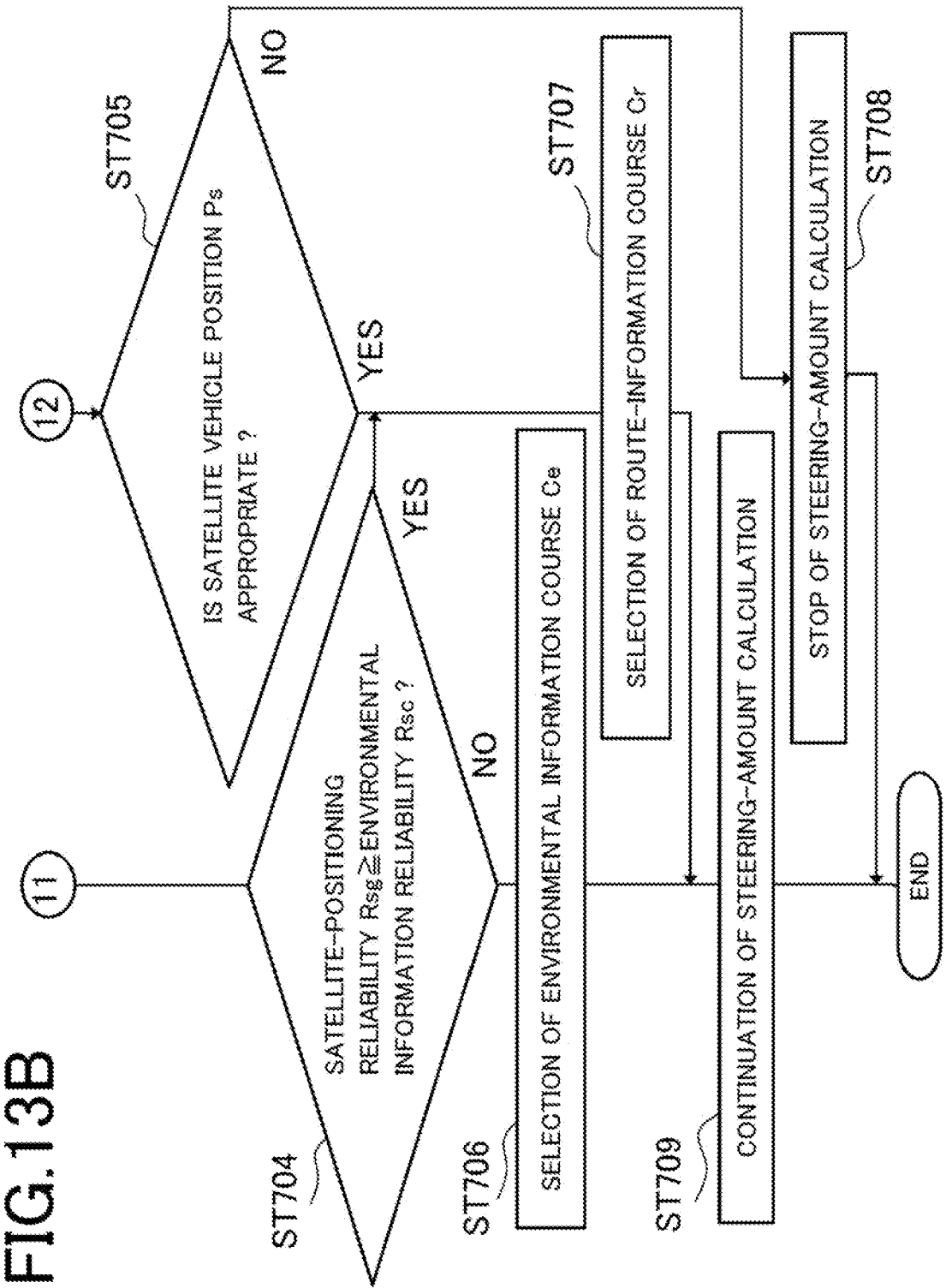
FIG. 13B is a second half of the second flowchart representing processing, according to Embodiment 2, for stopping steering-amount calculation at the merging timing.

FIGS. 13A and 13B are a first half and a second half of a second flowchart representing processing in which the vehicle control apparatus 51a according to Embodiment 2 stops steering-amount calculation during a period of merging. There is explained processing in a state where the route-information course Cr based on the output value of the GNSS sensor 9 is selected during a period from a time when the vehicle passes through a position before a merging point or the vicinity thereof to a time when the vehicle passes through the merging completion point. In the case where the distance between the satellite vehicle position Ps and the environmental-information vehicle position Pe or the vehicle-condition-amount vehicle position Pc is larger than a steering stopping distance, the second steering-amount-calculation stopping unit 39 determines that course generation cannot be performed and then makes the steering-amount calculation unit 41a stop steering-amount-calculation.

The flowchart in FIGS. 13A and 13B is implemented every predetermined time (for example, every 1 ms). The processing may be implemented not every predetermined time but at each external event such as input of a vehicle-speed-sensor signal or reception of data of the GNSS sensor. Alternatively, the processing in FIGS. 13A and 13B may constantly be implemented.

The processing in the steps ST700 through ST709 excluding the step ST705 in FIGS. 13A and 13B is the same as that in the steps ST500 through ST509 (excluding the step ST505) in FIGS. 11A and 11B according to Embodiment 2. In the present embodiment, the explanation therefor will be omitted.

In the step ST705, it is determined whether or not the satellite vehicle position Ps calculated based on the output value of the GNSS sensor 9 is appropriate. In the case where the distance between the satellite vehicle position Ps and the environmental-information vehicle position Pe or the vehicle-condition-amount vehicle position Pc is the same as or smaller than a steering stopping distance, the second steering-amount-calculation stopping unit 39 determines that the satellite vehicle position Ps is appropriate. In the case of YES, the step ST705 is followed by the step ST707; in the case of NO, the step ST705 is followed by the step ST708.

In the step ST708, the second steering-amount-calculation stopping unit 39 makes the steering-amount calculation unit 41a stop steering-amount calculation. The steering-amount calculation unit 41a gradually decreases a correction coefficient for stopping the steering control from 1 to 0, multiplies the steering amount to be outputted to the steering control apparatus 6 by the correction coefficient, and outputs the multiplication result, so that the autonomous steering control is stopped.

As described above, in the vehicle control apparatus 51a according to Embodiment 2, it is monitored whether or not the satellite vehicle position Ps obtained through the GNSS sensor 9 is appropriate during a period of forking or merging, so that in the case where the error in the positioning by the GNSS sensor 9 becomes large, autonomous steering control can be prevented from being continued.

Variant Example of Embodiments

In Embodiments described above, the respective dimensions, shapes, relative arrangement relationships, or implementation conditions of constituent elements may also be described; however, these are examples in all situations, and are not limited to the ones described in the specification of the present disclosure.

Therefore, an infinite number of unexemplified variant examples and equivalents are conceivable within the range of the technology disclosed in the specification of the present disclosure. For example, there are included the case where at least one constituent element is modified, added, or omitted and the case where at least one constituent element of at least one embodiment is extracted and then combined with constituent elements of other embodiments.

Moreover, it may be allowed that constituent elements that each are described as being provided "one" in number in the foregoing embodiments are provided "one or more" in number, as long as no discrepancy occurs.

Furthermore, the respective constituent elements in the foregoing embodiments are conceptual units; the ranges of technologies disclosed in the specification of the present disclosure include the case where one constituent element includes two or more structures, the case where one constituent element corresponds to part of a specific structure, and the case where two or more structures are provided in one structure.

Each of the constituent elements in the foregoing embodiments includes a structure having another structure or shape, as long as it exerts the same function.

The explanations in the specification of the present disclosure are referred to for all the purposes related to the present technology and none of them recognizes that the technology is the conventional one.

Each of the constituent elements in the foregoing embodiments is presumed not only as software or firmware but also as hardware corresponding thereto; in each of the both concepts, each of the constituent elements is referred to as "a unit", "a processing circuit", or the like.

What is claimed is:

1. A course generation apparatus comprising:
   an environmental information acquisitor that acquires environmental information of surroundings of a vehicle;
   an environmental-information course calculator that calculates a course on which a vehicle should advance, based on the environmental information acquired by the environmental information acquisitor;
   a positioning device that positions a vehicle position, based on a signal from a positioning satellite;
   a route generator that generates an on-a-map route on which a vehicle should travel;
   a route information acquisitor that acquires information on a forward route of the vehicle position positioned by the positioning device, from the route generated by the route generator;
   a route-information course calculator that calculates a course on which a vehicle should advance, from the information on the forward route acquired by the route information acquisitor;
   a prohibition-section determinator that determines, in the case where the information on the forward route acquired by the route information acquisitor indicates forking from a main lane, that a present section is an environmental-information-course usage prohibition section, during a period from a time when the vehicle position positioned by the positioning device passes through a point before a forking starting point by a predetermined distance to a time when the vehicle position passes through a forking completion point; and
   a course selector that selects a course calculated by the route-information course calculator in the environmental-information-course usage prohibition section and that selects a course calculated by the environmental-information course calculator or a course calculated by the route-information course calculator in a section other than the environmental-information-course usage prohibition section.

2. The course generation apparatus according to claim 1, further comprising an environmental-information vehicle position calculator that calculates an environmental-information vehicle position, which is an estimation value of the vehicle position, based on the environmental information acquired by the environmental information acquisitor and information on the forward route acquired by the route information acquisitor,
   wherein the positioning device corrects the positioned vehicle position, based on the environmental-information vehicle position calculated by the environmental-information vehicle position calculator.

3. The course generation apparatus according to claim 2, wherein the positioning device calculates a satellite-positioning reliability, based on a signal from the positioning satellite, and
   wherein in the case where the satellite-positioning reliability becomes the same as or lower than a predetermined determination reliability, the positioning device corrects the positioned vehicle position, based on the environmental-information vehicle position calculated by the environmental-information vehicle position calculator.

4. The course generation apparatus according to claim 1, further comprising
   a vehicle-condition-amount acquisitor that acquires a vehicle condition amount and a vehicle-condition-amount vehicle position calculator that calculates a vehicle-condition-amount vehicle position, which is an estimation value of the vehicle position, based on the vehicle condition amount acquired by the vehicle-condition-amount acquisitor, wherein the positioning device corrects the positioned vehicle position, based on the vehicle-condition-amount vehicle position calculated by the vehicle-condition-amount vehicle position calculator.

5. The course generation apparatus according to claim 4, wherein the positioning device calculates a satellite-positioning reliability, based on a signal from the positioning satellite, and wherein in the case where the satellite-positioning reliability becomes the same as or lower than a predetermined second determination reliability, the positioning device corrects the positioned vehicle position, based on the vehicle-condition-amount vehicle position calculated by the vehicle-condition-amount vehicle position calculator.

6. The course generation apparatus according to claim 1, wherein the environmental information acquisitor acquires information pieces from at least two of a vehicle front camera, a vehicle peripheral camera, a vehicle peripheral radar, and a LiDAR.

7. A vehicle control apparatus comprising:
the course generation apparatus according to claim 1; and
a steering-amount calculator that calculates a steering amount, based on a course selected by the course selector of the course generation apparatus.

8. The vehicle control apparatus according to claim 7, wherein the course generation apparatus has a steering-amount-calculation stopper that stops the steering-amount calculator from calculating a steering amount, in the case where a difference between a course calculated by the environmental-information course calculator and a course calculated by the route-information course calculator exceeds a predetermined steering-amount-calculation stopping determination value.

9. The vehicle control apparatus according to claim 7, wherein the course generation apparatus includes
an environmental-information vehicle position calculator that calculates an environmental-information vehicle position, which is an estimation value of the vehicle position, based on the environmental information acquired by the environmental information acquisitor and information on the forward route acquired by the route information acquisitor,
a vehicle-condition-amount acquisitor that acquires a vehicle condition amount,
a vehicle-condition-amount vehicle position calculator that calculates a vehicle-condition-amount vehicle position, which is an estimation value of the vehicle position, based on the vehicle condition amount acquired by the vehicle-condition-amount acquisitor, and
a second steering-amount-calculation stopper that stops the steering-amount calculator from calculating a steering amount based on the selected course, in the case where a distance between the vehicle position positioned by the positioning device and the environmental-information vehicle position calculated by the environmental-information vehicle position calculator or a distance between the vehicle position positioned by the positioning device and the vehicle-condition-amount vehicle position calculated by the vehicle-condition-amount vehicle position calculator is larger than a predetermined steering-amount-calculation stopping distance.

* * * * *